US012794656B2

(12) United States Patent
Maamari et al.

(10) Patent No.: US 12,794,656 B2
(45) Date of Patent: Nov. 10, 2026

(54) ENHANCEMENTS FOR SEMI-STATIC CODEBOOK WITH EFFICIENT SCHEDULING

(71) Applicant: QUALCOMM Incorporated, San Diego, CA (US)

(72) Inventors: Diana Maamari, San Diego, CA (US); Mostafa Khoshnevisan, San Diego, CA (US); Gabi Sarkis, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 259 days.

(21) Appl. No.: 18/770,278

(22) Filed: Jul. 11, 2024

(65) Prior Publication Data

US 2026/0019227 A1 Jan. 15, 2026

(51) Int. Cl.

| | |
|---|---|
| ***H04L 5/14*** | (2006.01) |
| ***H04W 24/08*** | (2009.01) |
| ***H04W 72/0446*** | (2023.01) |
| ***H04W 72/12*** | (2023.01) |

(52) U.S. Cl.

CPC ........... *H04L 5/1469* (2013.01); *H04W 24/08* (2013.01); *H04W 72/0446* (2013.01); *H04W 72/12* (2013.01)

(58) Field of Classification Search

CPC ... H04L 1/1607; H04L 1/1812; H04L 5/0055; H04W 72/23; H04W 72/0446

See application file for complete search history.

(56) References Cited

U.S. PATENT DOCUMENTS

| | | | | |
|---|---|---|---|---|
| 9,980,262 B2 * | 5/2018 | Gao | .................. | H04W 72/1215 |
| 2014/0044028 A1 | 2/2014 | Nammi et al. | | |

(Continued)

FOREIGN PATENT DOCUMENTS

| | | |
|---|---|---|
| CN | 110351837 A | 10/2019 |
| CN | 111277388 A | 6/2020 |

(Continued)

OTHER PUBLICATIONS

ZTE: "On Scheduling/HARQ Enhancements for NR URLLC", 3GPP TSG RAN WG1 #96bis, Xi'an, R1-1904146, China, Apr. 8, 2019-Apr. 12, 2019, Apr. 3, 2019, pp. 1 and 5, pp. 1-7.

(Continued)

*Primary Examiner* — Mahran Y Abu Roumi
(74) *Attorney, Agent, or Firm* — Holland & Hart LLP/QUALCOMM Incorporated

(57) ABSTRACT

Methods, systems, and devices for wireless communications are described. A user equipment (UE) may receive control signaling that indicates a set of parameters for wideband communication with the UE in accordance with a time division duplexing (TDD) pattern, the TDD pattern comprising a first time period during which scheduling the UE for wideband communication is available and a second time period during which scheduling the UE for wideband communication is not available. The UE may monitor for a wideband communication scheduled for the first time period in accordance with the set of parameters. The UE may transmit a semi-static feedback codebook associated with the wideband communication based on a result of the monitoring, wherein the semi-static feedback codebook includes feedback information for the wideband communication scheduled for the first time period and omits feedback information for the second time period.

30 Claims, 17 Drawing Sheets

(56) References Cited

U.S. PATENT DOCUMENTS

| | | | |
|---|---|---|---|
| 2016/0037386 | A1 | 2/2016 | Pitchaiah et al. |
| 2019/0312713 | A1 | 10/2019 | Yang et al. |
| 2020/0007275 | A1 | 1/2020 | Sarkis et al. |
| 2020/0112965 | A1 | 4/2020 | Kim et al. |
| 2022/0131655 | A1 | 4/2022 | Rico Alvarino et al. |
| 2023/0171073 | A1* | 6/2023 | Gao ...................... H04L 5/0055 370/329 |
| 2023/0337201 | A1 | 10/2023 | Alriksson et al. |
| 2024/0430749 | A1 | 12/2024 | Chakka et al. |
| 2025/0126307 | A1 | 4/2025 | Liu et al. |
| 2025/0247173 | A1 | 7/2025 | Rico Alvarino et al. |
| 2025/0261179 | A1 | 8/2025 | Wang et al. |
| 2025/0323762 | A1* | 10/2025 | Falahati ................ H04L 1/1861 |
| 2025/0330957 | A1 | 10/2025 | Sarkis et al. |

FOREIGN PATENT DOCUMENTS

| | | | |
|---|---|---|---|
| EP | 3698500 | A1 | 8/2020 |
| WO | 2016163941 | A1 | 10/2016 |
| WO | WO-2019192715 | A1 | 10/2019 |
| WO | WO-2020146892 | A1 | 7/2020 |

OTHER PUBLICATIONS

Interdigital Inc: "UCI Enhancements for eURLLC", 3GPP Draft, R1-1912729, 3GPP TSG RAN WG1 #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823566, 10 Pages, p. 3, par. above Proposal 9.

International Preliminary Report on Patentability—PCT/US2021/056242—The International Bureau of WIPO—Geneva, Switzerland—May 4, 2023.

International Search Report and Written Opinion—PCT/US2021/056242—ISA/EPO—Jul. 6, 2022.

Nokia., et al., "Discussion on Enhancements to Scheduling/HARQ for NR URLLC", 3GPP TSG RAN WG1 Meeting #98bis, R1-1910853, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 7, 2019, 12 Pages, XP051808981.

Partial International Search Report—PCT/US2021/056242—ISA/EPO—Feb. 22, 2022.

ZTE: "On Scheduling/HARQ Enhancements for NR URLLC", R1-1904146, 3GPP TSG RAN WG1 #96bis, 3rd Generation Partnership Project, Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 3, 2019, XP051707146, 7 Pages, p. 5, par. above Alt. 1, p. 5, Alt. 1-2, p. 6, Alt. 3.

Huawei: "Feature lead summary#2 of HARQ enhancements for NR-U", 3GPP TSG RAN WG1 Meeting #98bis, R1-1911618, Chongqing, China, Oct. 14-20, 2019, Oct. 22, 2019, 30 Pages.

* cited by examiner

ENHANCEMENTS FOR SEMI-STATIC CODEBOOK WITH EFFICIENT SCHEDULING

FIELD OF TECHNOLOGY

The following relates to wireless communications, including enhancements for semi-static codebook with efficient scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a user equipment (UE) is described. The method may include receiving control signaling that indicates a set of parameters for wideband communication with the UE in accordance with a time division duplexing (TDD) pattern, the TDD pattern including a first time period during which scheduling the UE for wideband communication is available and a second time period during which scheduling the UE for wideband communication is not available, monitoring for a wideband communication scheduled for the first time period in accordance with the set of parameters, and transmitting a semi-static feedback codebook associated with the wideband communication based on a result of the monitoring, where the semi-static feedback codebook includes feedback information for the wideband communication scheduled for the first time period and omits feedback information for the second time period.

A UE for wireless communications is described. The UE may include one or more memories storing processor executable code, a transceiver, and one or more processors coupled with the one or more memories and transceiver. The one or more processors may individually or collectively be operable to execute the code to cause the UE to receive control signaling that indicates a set of parameters for wideband communication with the UE in accordance with a TDD pattern, the TDD pattern including a first time period during which scheduling the UE for wideband communication is available and a second time period during which scheduling the UE for wideband communication is not available, monitor for a wideband communication scheduled for the first time period in accordance with the set of parameters, and transmit a semi-static feedback codebook associated with the wideband communication based on a result of the monitoring, where the semi-static feedback codebook includes feedback information for the wideband communication scheduled for the first time period and omits feedback information for the second time period.

Another UE for wireless communications is described. The UE may include means for receiving control signaling that indicates a set of parameters for wideband communication with the UE in accordance with a TDD pattern, the TDD pattern including a first time period during which scheduling the UE for wideband communication is available and a second time period during which scheduling the UE for wideband communication is not available, means for monitoring for a wideband communication scheduled for the first time period in accordance with the set of parameters, and means for transmitting a semi-static feedback codebook associated with the wideband communication based on a result of the monitoring, where the semi-static feedback codebook includes feedback information for the wideband communication scheduled for the first time period and omits feedback information for the second time period.

A non-transitory computer-readable medium storing code for wireless communications is described. The code may include instructions executable by one or more processors to receive control signaling that indicates a set of parameters for wideband communication with the UE in accordance with a TDD pattern, the TDD pattern including a first time period during which scheduling the UE for wideband communication is available and a second time period during which scheduling the UE for wideband communication is not available, monitor for a wideband communication scheduled for the first time period in accordance with the set of parameters, and transmit a semi-static feedback codebook associated with the wideband communication based on a result of the monitoring, where the semi-static feedback codebook includes feedback information for the wideband communication scheduled for the first time period and omits feedback information for the second time period.

In some examples of the method, user equipment (UEs), and non-transitory computer-readable medium described herein, the first time period of the TDD pattern includes a set of multiple scheduling opportunities during which scheduling the UE for wideband communications may be available and the semi-static feedback codebook includes separate feedback information for each scheduling opportunity included in the set of multiple scheduling opportunities.

In some examples of the method, user equipment (UEs), and non-transitory computer-readable medium described herein, the first time period of the TDD pattern includes a bundled set of scheduling opportunities during which scheduling the UE for wideband communications may be available and the semi-static feedback codebook includes a single feedback information for the bundled set of scheduling opportunities.

Some examples of the method, user equipment (UEs), and non-transitory computer-readable medium described herein may further include operations, features, means, or instructions for performing, during the second time period, baseband processing for the wideband communication scheduled during the first time period.

In some examples of the method, user equipment (UEs), and non-transitory computer-readable medium described herein, the baseband processing may be performed while the UE may be operating at a second power level that may be a lower power level than a first power level the UE may be operating at during the first time period.

In some examples of the method, user equipment (UEs), and non-transitory computer-readable medium described herein, the set of parameters identifies a set of candidate scheduling offsets between the first time period and a transmission time associated with the semi-static feedback codebook, the second time period may be identified based on the set of candidate scheduling offsets, and the set of candidate scheduling offsets may be a smaller set than a set of available scheduling offsets.

In some examples of the method, user equipment (UEs), and non-transitory computer-readable medium described herein, the set of parameters identifies a set of candidate scheduling offsets between the first time period and a transmission time associated with the semi-static feedback codebook, the second time period may be identified based on the set of candidate scheduling offsets, and the set of candidate scheduling offsets includes one or more candidate scheduling offsets that exceed a scheduling offset threshold associated with a set of available scheduling offsets.

In some examples of the method, user equipment (UEs), and non-transitory computer-readable medium described herein, the TDD pattern includes a set of time segments, each time segment including the first time period during which scheduling the UE for wideband communication may be available and the second time period during which the UE performs baseband processing of the wideband communication received during the first time period.

In some examples of the method, user equipment (UEs), and non-transitory computer-readable medium described herein, the semi-static feedback codebook includes feedback information for the first time period in each time segment.

A method for wireless communications by a network entity is described. The method may include outputting, to a UE, control signaling that indicates a set of parameters for wideband communication with the UE in accordance with a TDD pattern, the TDD pattern including a first time period during which scheduling the UE for wideband communication is available and a second time period during which scheduling the UE for wideband communication is not available, outputting a wideband communication to the UE scheduled for the first time period in accordance with the set of parameters, and obtaining a semi-static feedback codebook associated with the wideband communication from the UE, where the semi-static feedback codebook includes feedback information for the wideband communication scheduled for the first time period and omits feedback information for the second time period.

A network entity for wireless communications is described. The network entity may include one or more memories storing processor executable code and one or more processors coupled with the one or more memories. The one or more processors may individually or collectively be operable to execute the code to cause the network entity to output, to a UE, control signaling that indicates a set of parameters for wideband communication with the UE in accordance with a TDD pattern, the TDD pattern including a first time period during which scheduling the UE for wideband communication is available and a second time period during which scheduling the UE for wideband communication is not available, output a wideband communication to the UE scheduled for the first time period in accordance with the set of parameters, and obtain a semi-static feedback codebook associated with the wideband communication from the UE, where the semi-static feedback codebook includes feedback information for the wideband communication scheduled for the first time period and omits feedback information for the second time period.

Another network entity for wireless communications is described. The network entity may include means for outputting, to a UE, control signaling that indicates a set of parameters for wideband communication with the UE in accordance with a TDD pattern, the TDD pattern including a first time period during which scheduling the UE for wideband communication is available and a second time period during which scheduling the UE for wideband communication is not available, means for outputting a wideband communication to the UE scheduled for the first time period in accordance with the set of parameters, and means for obtaining a semi-static feedback codebook associated with the wideband communication from the UE, where the semi-static feedback codebook includes feedback information for the wideband communication scheduled for the first time period and omits feedback information for the second time period.

A non-transitory computer-readable medium storing code for wireless communications is described. The code may include instructions executable by one or more processors to output, to a UE, control signaling that indicates a set of parameters for wideband communication with the UE in accordance with a TDD pattern, the TDD pattern including a first time period during which scheduling the UE for wideband communication is available and a second time period during which scheduling the UE for wideband communication is not available, output a wideband communication to the UE scheduled for the first time period in accordance with the set of parameters, and obtain a semi-static feedback codebook associated with the wideband communication from the UE, where the semi-static feedback codebook includes feedback information for the wideband communication scheduled for the first time period and omits feedback information for the second time period.

In some examples of the method, network entities, and non-transitory computer-readable medium described herein, the first time period of the TDD pattern includes a set of multiple scheduling opportunities during which scheduling the UE for wideband communications may be available and the semi-static feedback codebook includes separate feedback information for each scheduling opportunity included in the set of multiple scheduling opportunities.

In some examples of the method, network entities, and non-transitory computer-readable medium described herein, the first time period of the TDD pattern includes a bundled set of scheduling opportunities during which scheduling the UE for wideband communications may be available and the semi-static feedback codebook includes a single feedback information for the bundled set of scheduling opportunities.

In some examples of the method, network entities, and non-transitory computer-readable medium described herein, the set of parameters identifies a set of candidate scheduling offsets between the first time period and a transmission time associated with the semi-static feedback codebook, the second time period may be identified based on the set of candidate scheduling offsets, and the set of candidate scheduling offsets may be a smaller set than a set of available scheduling offsets.

In some examples of the method, network entities, and non-transitory computer-readable medium described herein, the set of parameters identifies a set of candidate scheduling offsets between the first time period and a transmission time associated with the semi-static feedback codebook, the second time period may be identified based on the set of candidate scheduling offsets, and the set of candidate scheduling offsets includes one or more candidate scheduling offsets that exceed a scheduling offset threshold associated with a set of available scheduling offsets.

In some examples of the method, network entities, and non-transitory computer-readable medium described herein, the TDD pattern includes a set of time segments, each time segment including the first time period during which scheduling the UE for wideband communication may be available and the second time period during which the UE performs baseband processing of the wideband communication received during the first time period.

In some examples of the method, network entities, and non-transitory computer-readable medium described herein, the semi-static feedback codebook includes feedback information for the first time period in each time segment.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Wireless networks may schedule user equipment (UE) for wideband communications where the UE operates at its higher power level in order to receive the communications via the wide bandwidth. The high-power state includes the UE using a higher clock frequency and generally a higher supply voltage, which may lead to an increase in power consumption by the UE. In some examples, the wideband communications may be scheduled in an efficient manner where the UE is scheduled for the wideband communications during a first time period (e.g., a first slot or set of slots) and then the UE is not scheduled for the wideband communications during a second time period (e.g., the next few slot(s)). However, this approach introduces issues with regards to the hybrid automatic repeat/request (HARQ) feedback of the UE. For example, the slot(s) of the second time period may also be downlink slots such that the UE is expected to provide HARQ feedback for those slots in addition to the slot(s) of the first time period. This approach is inefficient in that the result is the UE providing HARQ feedback for the slot(s) of the second time period during which the UE is not scheduled for wideband communications.

Accordingly, aspects of the techniques described herein provide for deterministic gap periods (e.g., the slot(s) of the second time period) where the UE omits HARQ feedback for those slot(s). For example, the UE may receive or otherwise obtain control signaling that indicates a set of parameters for wideband communication with the UE in accordance with a time division duplexing (TDD) pattern. The TDD pattern may include the first time period during which scheduling the UE for wideband communication is available and the second time period during which scheduling the UE for wideband communication is not available. These slot(s) of the second time period may also be referred to as gap periods during which the UE performs baseband processing of the wideband communications received during the first time period. Accordingly, the UE may monitor for wideband communications scheduled for the first time period in accordance with the set of parameters. The UE may transmit or otherwise output a semi-static feedback codebook (e.g., a Type 1 HARQ codebook) associated with the wideband communication based on a result of the monitoring. The semi-static feedback codebook may include feedback information for the wideband communication scheduled for the first time period and omits feedback information for the second time period. For example, the UE may not be expected to include bit(s) in the HARQ codebook corresponding to the slot(s) of the second time period.

Aspects of the disclosure are initially described in the context of wireless communications systems. Aspects of the disclosure are further illustrated by and described with reference to apparatus diagrams, system diagrams, and flowcharts that relate to enhancements for semi-static codebook with efficient scheduling.

Figure 1:
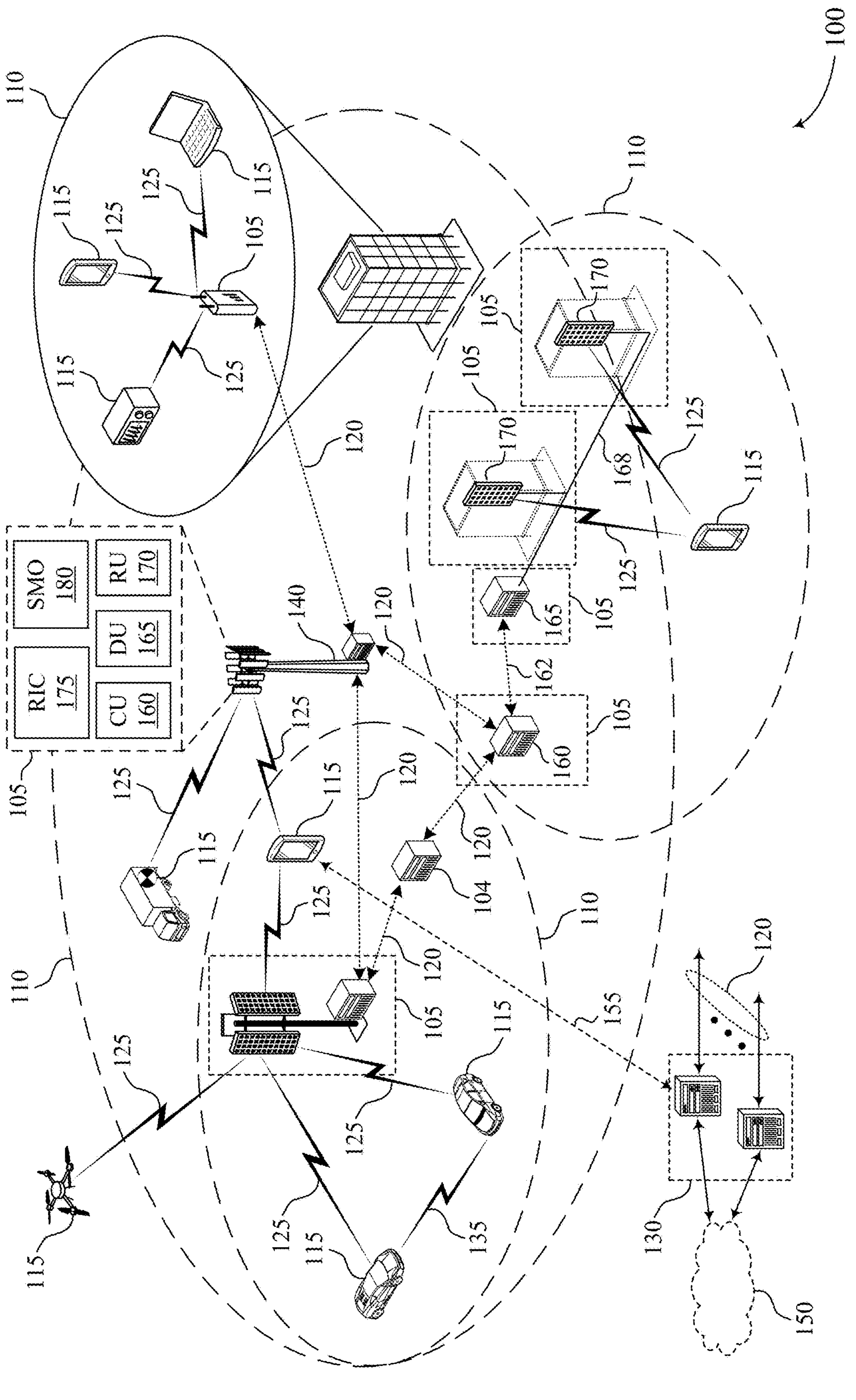
FIG. 1 shows an example of a wireless communications system that supports enhancements for semi-static codebook with efficient scheduling in accordance with one or more aspects of the present disclosure.

FIG. 1 shows an example of a wireless communications system 100 that supports enhancements for semi-static codebook with efficient scheduling in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node (s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300

GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may receive control signaling that indicates a set of parameters for wideband communication with the UE in accordance with a TDD pattern, the TDD pattern comprising a first time period during which scheduling the UE for wideband communication is available and a second time period during which scheduling the UE 115 for wideband communication is not available. The UE 115 may monitor for a wideband communication scheduled for the first time period in accordance with the set of parameters. The UE 115 may transmit a semi-static feedback codebook associated with the wideband communication based on a result of the monitoring, wherein the semi-static feedback codebook includes feedback information for the wideband communication scheduled for the first time period and omits feedback information for the second time period.

A network entity 105 may output, to a UE 115, control signaling that indicates a set of parameters for wideband communication with the UE 115 in accordance with a TDD pattern, the TDD pattern comprising a first time period during which scheduling the UE for wideband communication is available and a second time period during which scheduling the UE for wideband communication is not available. The network entity 105 may output a wideband communication to the UE 115 scheduled for the first time period in accordance with the set of parameters. The network entity 105 may obtain a semi-static feedback codebook associated with the wideband communication from the UE 115, wherein the semi-static feedback codebook includes feedback information for the wideband communication scheduled for the first time period and omits feedback information for the second time period.

Figure 2:
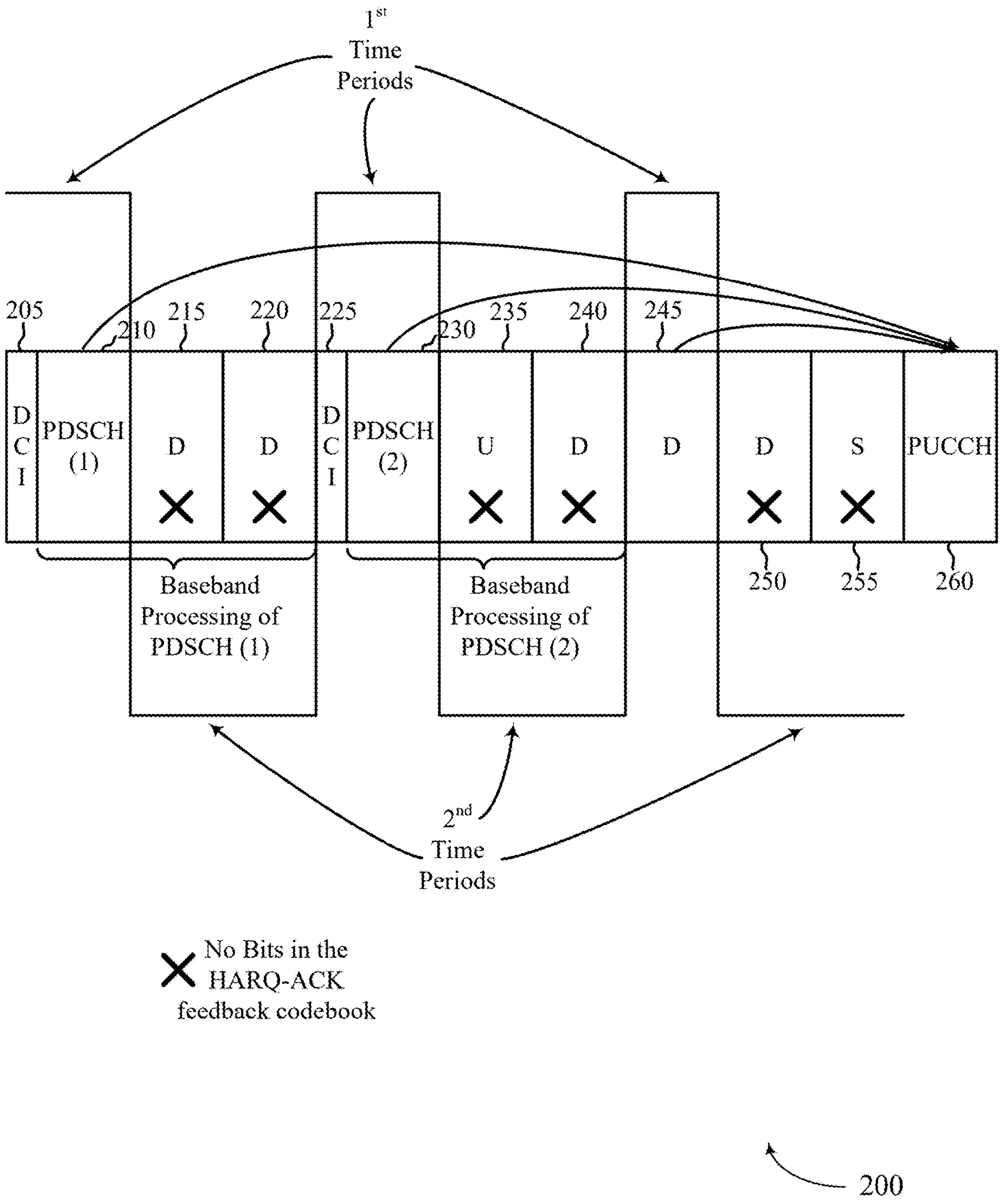
FIG. 2 shows an example of a feedback configuration that supports enhancements for semi-static codebook with efficient scheduling in accordance with one or more aspects of the present disclosure.

FIG. 2 shows an example of a feedback configuration 200 that supports enhancements for semi-static codebook with efficient scheduling in accordance with one or more aspects of the present disclosure. Feedback configuration 200 may implement aspects of wireless communications system 100. Aspects of feedback configuration 200 may be implemented at or implemented by a UE or a network entity, which may be examples of the corresponding devices described herein.

Wireless networks may utilize wideband communications between the network and UE. The wideband communications may include the UE being scheduled for communications in a wide frequency band (e.g., a 100 MHz bandwidth) to increase throughput for the UE. For such high throughput and wideband scheduling, the UE generally enters into its highest power state. For example, the UE may move its internal baseband clock and voltage to a higher power state when it moves to wideband scheduling. This high-power state generally involves a higher clock frequency and a generally higher power supply voltage to support the higher clock frequency. This may lead to a quadratic increase in power consumption by the UE as well as leakage.

In some cases, the network may indicate to or otherwise inform the UE regarding how long the UE will be schedule for wideband communications so that the UE can set its clock frequency and voltage as needed and necessary at the highest setting. That is, the UE may need to know that it won't be scheduled with sustained peak throughput and may not need to ramp up the clock to the highest power state. As one non-limiting example, the UE may be indicated that wideband scheduling is only for a slot 0 and not for slots 1, 2, and 3. In this example, the UE may relax its processing timeline and the baseband operations of the UE may be maintained at a lower power state. Thus, in some cases the network may provide a configuration to the UE that the maximum scheduled throughput will not exceed a limit, that a feedback timeline is relaxed, or that there will be gaps between physical downlink shared channel (PDSCH) messages.

Accordingly, the network may indicate or otherwise configure the UE with different information. One example of such information may be an indication that the maximum schedulable sustained throughput is lower than the peak throughput possible given the current configuration. Another example of such information may be an indication that the minimum data processing (or feedback) timeline is larger than the minimum possible value reported by the UE. The network may indicate or otherwise provide such configuration signaling to the UE at different times. For example, the network may configure the UE with this information as part of RRC (re) configuration signaling, when the bandwidth is changed, when the maximum number of MIMO layers is changed, when the maximum modulation order, code-rate, modulation and coding scheme (MCS), or MCS table is changed, when a BWP or a configuration profile is switched, or when cell(s) are activated or deactivated.

The UE may also be configured to provide HARQ-ACK feedback for the communications scheduled in the wide bandwidth (e.g., for PDSCH transmissions to the UE). One example of such feedback may include a Type 1 HARQ codebook, which may also be referred to as a semi-static feedback codebook. In this example, the codebook may be determined via semi-static information based on candidate PDSCH reception occasions. Semi-static information may refer to information that is received by the UE less frequently (e.g., information received via RRC signaling) than some other information that may instead be referred to as dynamic information (e.g., information received via DCI signaling). The UE may not consider physical downlink control channel (PDCCH) monitoring occasions for the Type 1 HARQ-ACK codebook. The set of PDSCH monitoring occasions may be determined on a per-downlink serving cell (e.g., CC) basis. Semi-static feedback or Type 1 HARQ codebook may be based on the set of candidate PDSCH reception occasions within a time window. In some wireless communications systems, the UE may include bits in the semi-static feedback (e.g., the semi-static codebook) for every candidate PDSCH occasion during the time window. Accordingly, in such wireless communications systems, the semi-static feedback or Type 1 HARQ codebook may have a fixed size that depends upon the number of candidate PDSCH monitoring occasions within the time window.

A set of configured K1 values may be configured for the UE, which may include a set of possible slot timing offset values (e.g., the offset between the PDSCH and the corresponding HARQ-ACK feedback) that may be indicated in the DCI that schedules the PDSCH transmissions to the UE. Possible K1 values may include {1,2,3,4,5,6,7,8} if only DCI format 1_0 is configured and DCI format 1_1 is not configured for the serving cell. If the DCI format 1_1 or 1_2 are configured for the serving cell, then the Kl value is provided by a dl-DataToUL-ACK parameter.

For each Kl value, the set of PDSCH time domain resource allocation (TDRA) candidates (e.g., corresponding to a start and length indicator value (SLIV) within a slot) may be considered. In some aspects, the TDRA candidates that overlap with semi-static uplink symbols may be removed (e.g., for TDD). In some aspects, the remaining TDRA row may be grouped such that the number of groups is the maximum number of non-overlapping SLIVs in the slot. This may be unnecessary if the maximum number of PDSCH messages (or "PDSCHs") per slot is one (e.g., based on UE capability or RRC configuration).

The Type 1 HARQ-ACK codebook may accommodate as many bits as potential PDSCH reception occasions (only a subset of PDSCH transmissions may be actually scheduled). For example, if the TDRA indicates SLIVs for symbols {0-6}, {7-13}, there are two bits per K1 value per CC. If K1 equals (1,2,3), there are 2*3 bits per CC for FDD (and slightly less for TDD depending on how many SLIVs overlap with uplink symbols). Accordingly, the UE may determine the PDSCH reception or monitoring occasions based on the K1 set and the SLIV and then determine the HARQ-ACK codebook based on the candidate PDSCH reception or monitoring occasions.

Some wireless networks may provide for time domain segments to be defined such that one bit in the ACK/NACK codebook corresponds to one time segment. If there are multiple PDSCHs or codeblocks of PDSCH scheduled within one time segment, the corresponding ACK/NACK bits may be bundled into one ACK/NACK bit (e.g., bundled by application of a logical AND operation to the ACK/NACK bits of the HARQ-ACK codebook). In some aspects, this may not matter how many PDSCHs are received in the time segment. The time segment may correspond to a slot, multiple slots, a sub-slot (e.g., a set of symbol(s) within a slot, or other time domain segment). The time segments may not have a fixed size (e.g., the time domain segments may have a non-uniform length or duration). The time segment may be defined absolutely (e.g., based on a slot index or symbol index) or may be relative to the PUCCH transmission occasion (e.g., x slots/symbols before the first PUCCH symbol that the HARQ-ACK codebook will be provided). The time domain segment may be applied to multiple CCs for a CA configuration. Some networks may also extend the definition of the segment to the time and frequency domains.

In some wireless networks efficient scheduling (e.g., high radio frequency/low baseband) may be configured for the UE. This may introduce gaps due to the longer baseband processing (e.g., a relaxed processing timeline). This may also include gaps between subsequent scheduled PDSCHs of the same burst depending on the frequency domain buffer or the time domain buffer size at the UE. In some aspects, the gaps may be fixed (e.g., three slots may be needed for baseband processing with every PDSCH).

Accordingly, aspects of the techniques described herein may optimize the semi-static HARQ-ACK codebook when the UE is scheduled with such efficient scheduling (e.g., for wideband communications). Aspects of the techniques described herein provide for optimizations of the HARQ-ACK codebook in view of such gaps. For example, the UE may receive or otherwise obtain (and the network entity may transmit or otherwise output) control signaling that indicates, identifies, or otherwise configures a set of parameters for wideband communications with the UE in accordance with a TDD pattern. The UE may be indicated or otherwise configured to be in such efficient scheduling mode (e.g., the wideband communication scheduling mode) using RRC or MAC-CE signaling. The TDD pattern may generally identify or otherwise define a first time period during which scheduling the UE for wideband communications is available and a second time period during which scheduling the UE for wideband communications is not available. The UE may operate in accordance with the TDD pattern or duty cycle. In one non-limiting example, this may include one slot that can be scheduled every three slots.

In some aspects, the UE receiving the control signaling may include the UE receiving or otherwise obtaining first configuration information for downlink scheduling in accordance with a first threshold throughput. The first threshold throughput may correspond to the scheduling the UE for wideband communications during the first time period. That is, the wideband communications may be associated with or otherwise support the first threshold throughput. Additionally, or alternatively, this may include the UE receiving or otherwise obtaining second configuration information for downlink scheduling in accordance with a second threshold throughput. The second threshold throughput may be less than or otherwise lower than the first threshold throughput. The second threshold throughput may correspond to the second time period during which scheduling the UE for wideband communications is not available. For example, the second threshold throughput may correspond to narrowband communications scheduled during the second time period.

The UE may monitor for wideband communications scheduled during or for the first time period in accordance with the set of parameters. In the non-limiting example shown in FIG. 2, this may include the UE monitoring for a DCI grant 205 that schedules a first wideband downlink transmission (e.g., a first PDSCH 210). The UE may monitor for and receive the first PDSCH 210 in accordance with the set of parameters. The UE may be operating in a first power state (e.g., a highest power state) while monitoring for and receiving the wideband communications during the first time period. Thus, the UE may receive PDSCH in or during the first time period (e.g., the first PDSCH 210) and not receive PDSCH in or during the second time period (E.g., during a slot 215 and a slot 220) in accordance with the second configuration information.

The UE may begin performing baseband processing of the first PDSCH 210 during the slot 215 and the slot 220. That is, the UE may perform baseband processing of the wideband communications scheduled during the first time period (e.g., the first PDSCH 210) during the second time period (e.g., during the slot 215 and the slot 220). In some aspects, the baseband processing may be performed while the UE is operating at a second power level that is a lower power level than a first power level the UE is operating at during the first time period. For example, the UE may transition to a lower power state during the second time period during the baseband processing to conserve power.

Thus, in this example the first time period may include the time period during which the UE is scheduled for wideband communications (e.g., the first PDSCH 210) according to the set of parameters. In this example the second time period may correspond to the time period of slot 215 and slot 220 during which scheduling the UE for wideband communications is unavailable. That is, to allow the UE an extended amount of time to perform processing (e.g., baseband processing) for the first PDSCH 210, the slot 215 and the slot 220 may not be available for the network to schedule additional wideband communications with the UE according to the set of parameters, even though slot 215 and slot 220 are both configured as downlink slots and thus would otherwise be considered candidate PDSCH reception or monitoring occasions.

This may also include the UE monitoring for a DCI grant 225 that schedules a second wideband downlink transmission (e.g., a second PDSCH 230). The UE may monitor for and receive the second PDSCH 230 in accordance with the set of parameters. The UE may be operating in a first power state (e.g., a highest power state) while monitoring for and receiving the wideband communications during the first time period.

The UE may begin performing baseband processing of the second PDSCH 230 during a slot 235 and a slot 240. That is, the UE may perform baseband processing of the wideband communications scheduled during the first time period (e.g., the second PDSCH 230) during the second time period (e.g., during the slot 235 and the slot 240). In some aspects, the baseband processing may be performed while the UE is operating at a second power level that is a lower power level than a first power level the UE is operating at during the first time period. For example, the UE may transition to a lower power state during the second time period during the baseband processing to conserve power.

Thus, in this example the first time period may also include the time period during which the UE is scheduled for wideband communications (e.g., the second PDSCH 230) according to the set of parameters. In this example the second time period may correspond to the time period of slot 235 and slot 240 during which scheduling the UE for wideband communications is unavailable. That is, even though slot 235 and slot 240 are both configured as wideband communication slots and would otherwise be considered candidate PDSCH reception or monitoring occasion or PUSCH transmission occasion, these slots are not available to schedule wideband communications with the UE according to the set of parameters.

Lastly, this may also include the UE monitoring for a DCI grant during a slot 245. The UE may monitor for the DCI grant in accordance with the set of parameters. However, in this instance the UE may not receive or otherwise detect a DCI grant during the slot 245 and is therefore not scheduled for wideband communications during the slot 245. Thus, in this example the first time period may include the time period during slot 245 according to the set of parameters. In this example the second time period may correspond to the time period of slot 250 and slot 255 during which scheduling the UE for wideband communications is unavailable. That is, even though slot 250 and slot 255 are both configured as wideband communication slots and would otherwise be considered candidate PDSCH reception or monitoring occasions, these slots are not available to schedule wideband communications with the UE according to the set of parameters.

Accordingly, the UE may transmit or otherwise output a semi-static feedback codebook associated with the wideband communications based on a result of the monitoring. For example, the UE may transmit the semi-static feedback codebook during a slot 260 using PUCCH resources configured during the slot 260. However, in some aspects the semi-static feedback codebook may include feedback information (e.g., ACK/NACK bits) for the wideband communications scheduled during the first time period and omit the feedback information for the second time period. For example, the semi-static feedback codebook (e.g., a Type 1 HARQ-ACK codebook) may include ACK/NACK bits corresponding to the candidate PDSCH monitoring occasions schedulable during the first time period and omit ACK/NACK bits corresponding to the candidate PDSCH monitoring occasions that would otherwise be, but are not, schedulable during the second time period.

In this non-limiting example, the semi-static feedback codebook may include ACK/NACK bits corresponding to the first PDSCH 210, the second PDSCH 230, and for the slot 245. However, the semi-static feedback codebook may omit or otherwise not include ACK/NACK bits corresponding to the gap periods of the slot 215, the slot 220, the slot 235, the slot 240, the slot 250, and the slot 255. That is, the UE may construct the Type 1 HARQ-ACK codebook by finding the intersection of the valid PDSCH slots based on the K1 values and the duty cycle (e.g., the TDD pattern) where the gaps are invalid PDSCH occasion slots.

In the non-limiting example shown in FIG. 2, each scheduled PDSCH in a duty cycle (e.g., TDD pattern) may have separate ACK/NACK bits while gaps due to the baseband busy activity will not have any ACK/NACK bits. This may effectively reduce the codebook size as compared to legacy operations with no TDD pattern or duty cycle.

Figure 3:
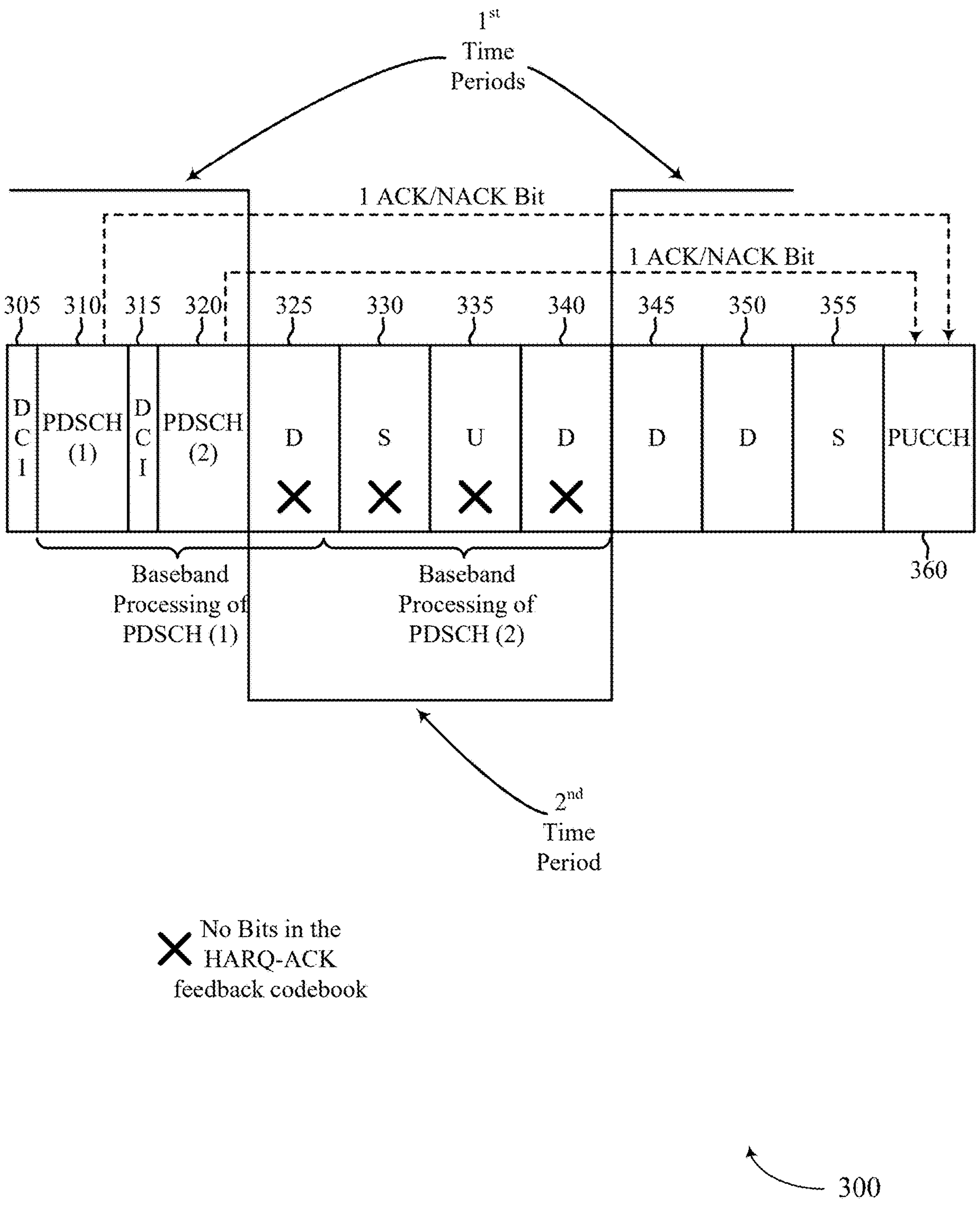
FIG. 3 shows an example of a feedback configuration that supports enhancements for semi-static codebook with efficient scheduling in accordance with one or more aspects of the present disclosure.

FIG. 3 shows an example of a feedback configuration 300 that supports enhancements for semi-static codebook with efficient scheduling in accordance with one or more aspects of the present disclosure. Feedback configuration 300 may implement aspects of wireless communications system 100 or aspects of feedback configuration 200. Aspects of feedback configuration 300 may be implemented at or implemented by a UE or a network entity, which may be examples of the corresponding devices described herein.

As discussed above, aspects of the techniques described herein may optimize the semi-static HARQ-ACK codebook when the UE is scheduled with efficient scheduling (e.g., for wideband communications). Aspects of the techniques described herein provide for optimizations of the HARQ-ACK codebook in view of gaps associated with wideband communications. For example, the UE may receive or otherwise obtain (and the network entity may transmit or otherwise output) control signaling that indicates, identifies, or otherwise configures a set of parameters for wideband communications with the UE in accordance with a TDD pattern. The UE may be indicated or otherwise configured to be in such efficient scheduling mode (e.g., the wideband communication scheduling mode) using RRC or MAC-CE signaling. The TDD pattern may generally identify or otherwise define a first time period during which scheduling the UE for wideband communications is available and a second time period during which scheduling the UE for wideband communications is not available. The UE may operate in accordance with the TDD pattern or duty cycle.

In the non-limiting example shown in FIG. 3, this may include the first time period of the TDD pattern including a plurality of scheduling opportunities during which scheduling the UE for wideband communications is available and the semi-static feedback codebook including separate feedback information for each scheduling opportunity.

For example, the UE may monitor for wideband communications scheduled during or for the first time period in accordance with the set of parameters. In the non-limiting example shown in FIG. 3, this may include the UE monitoring for a DCI grant 305 that schedules a first wideband downlink transmission (e.g., a first PDSCH 310). The DCI grant 305 and the first PDSCH 310 may occur in a first slot or in separate non-contiguous slots. The UE may monitor for and receive the first PDSCH 310 in accordance with the set of parameters. The UE may be operating in a first power state (e.g., a highest power state) while monitoring for and receiving the wideband communications during the first time period.

The UE may also monitor for a DCI grant 315 that schedules a second wideband downlink transmission (e.g., a second PDSCH 320). The UE may monitor for and receive the second PDSCH 320 in accordance with the set of parameters. The DCI grant 315 and the second PDSCH 320 may occur in a second slot or in separate non-contiguous slots. The UE may be operating in a first power state (e.g., a highest power state) while monitoring for and receiving the wideband communications during the first time period.

The UE may begin performing baseband processing of the first PDSCH 310 immediately after receiving the first PDSCH 310. The UE may, upon completion of the baseband processing of the first PDSCH 310, begin baseband processing of the second PDSCH 320. The UE may continue performing the baseband processing during a slot 325, a slot 330, a slot 335, and a slot 340. That is, the UE may begin performing baseband processing of the wideband communications scheduled during the first time period (e.g., the first PDSCH 310) during the first time period and continue the baseband processing (e.g., for the second PDSCH 320) during the second time period. In some aspects, the baseband processing may be performed while the UE is operating at a second power level that is a lower power level than a first power level the UE is operating at during the first time period. For example, the UE may transition to a lower power state during the second time period during the baseband processing to conserve power.

Thus, in this example the first time period may include the time period during which the UE is scheduled for wideband communications (e.g., the first PDSCH 310 and the second PDSCH 320) according to the set of parameters. In this example the second time period may correspond to the time period of slot 325, slot 330, slot 335, and slot 340 during which scheduling the UE for wideband communications is unavailable. That is, even though slot 325, slot 330, slot 335, and slot 340 may be configured as available slots and would otherwise be considered candidate PDSCH reception or monitoring occasions, these slots are not available to schedule wideband communications with the UE according to the set of parameters. Thus, these slots may correspond to gaps in the TDD pattern during which the UE cannot be scheduled for wideband communications.

The TDD pattern or duty cycle may include another instance of the first time period corresponding to a slot 345 and a slot 350, during which the UE may monitor for a DCI grant in accordance with the set of parameters. However, in this instance the UE may not receive or otherwise detect a DCI grant during the slot 345 or the slot 350, and is therefore not scheduled for wideband communications during these slots. That is, even though slot 345 and slot 350 may be configured as wideband communication slots and are candidate PDSCH reception or monitoring occasions, these slots are not scheduled for wideband communications with the UE according to the set of parameters. The next instance of the second time period may include a slot 355 during which the wideband communications are not available for scheduling for the UE.

Accordingly, the UE may transmit or otherwise output a semi-static feedback codebook associated with the wideband communications based on a result of the monitoring. For example, the UE may transmit the semi-static feedback codebook during a slot 360 using PUCCH resources configured during the slot 360. However, in some aspects the semi-static feedback codebook may include feedback information (e.g., ACK/NACK bits) for the wideband communications scheduled during the first time period and omit the feedback information for the second time period. For example, the semi-static feedback codebook (e.g., a Type 1 HARQ-ACK codebook) may include ACK/NACK bits corresponding to the candidate PDSCH monitoring occasions schedulable during the first time period and omit ACK/NACK bits corresponding to the candidate PDSCH monitoring occasions that would otherwise be, but are not, schedulable during the second time period. In this example, the semi-static feedback codebook includes a single feedback information (e.g., one bit) for the scheduling opportunity of the first PDSCH 310 and a single feedback information (e.g., a second bit) for the second PDSCH 320 that are scheduled during the first instance of the first time period of the TDD pattern).

Figure 4:
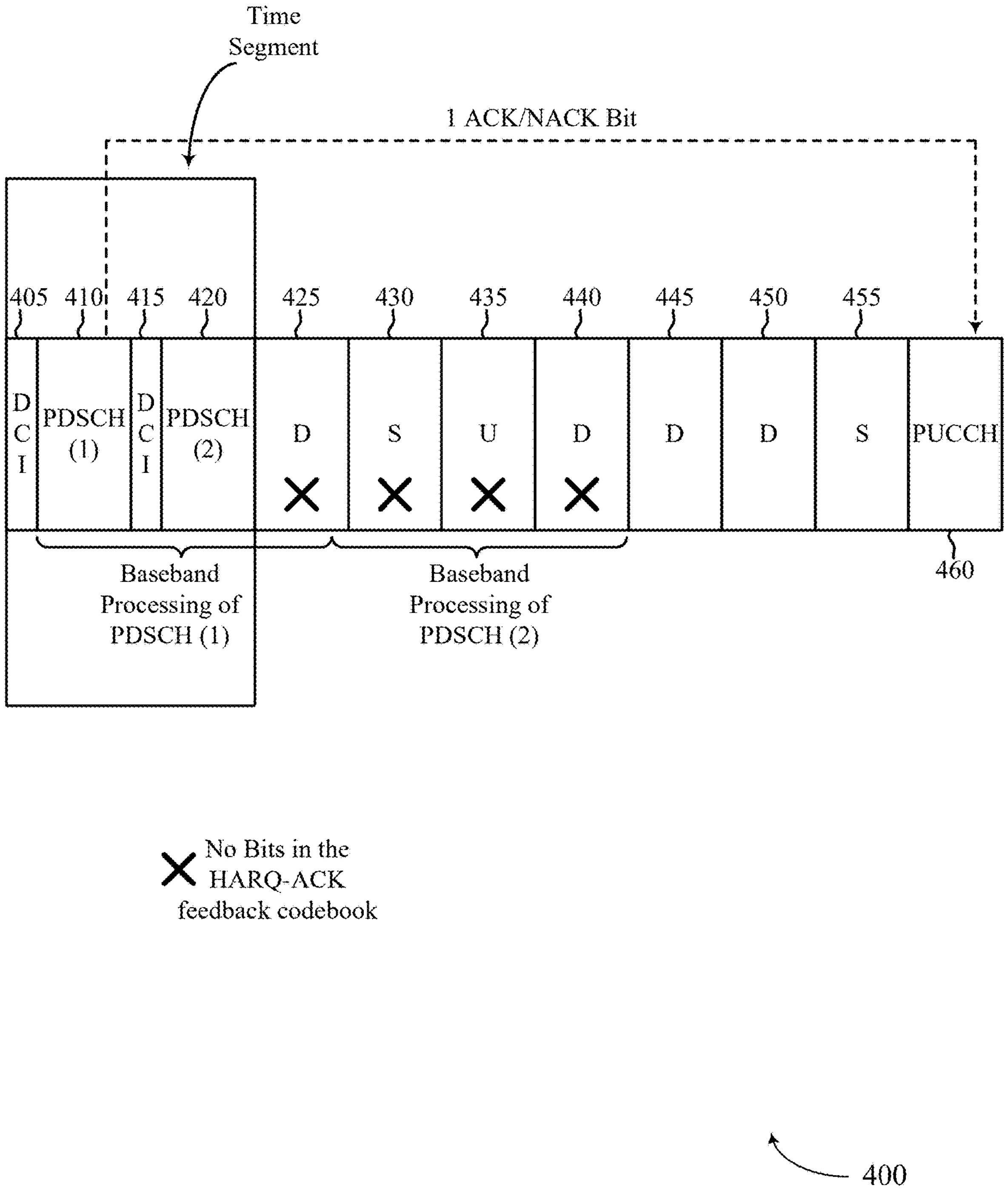
FIG. 4 shows an example of a feedback configuration that supports enhancements for semi-static codebook with efficient scheduling in accordance with one or more aspects of the present disclosure.

FIG. 4 shows an example of a feedback configuration 400 that supports enhancements for semi-static codebook with efficient scheduling in accordance with one or more aspects of the present disclosure. Feedback configuration 400 may implement aspects of wireless communications system 100 or aspects of feedback configuration 200 or feedback configuration 300. Aspects of feedback configuration 400 may be implemented at or implemented by a UE or a network entity, which may be examples of the corresponding devices described herein.

As discussed above, aspects of the techniques described herein may optimize the semi-static HARQ-ACK codebook when the UE is scheduled with efficient scheduling (e.g., for wideband communications). Aspects of the techniques described herein provide for optimizations of the HARQ-ACK codebook in view of gaps associated with wideband communications. For example, the UE may receive or otherwise obtain (and the network entity may transmit or otherwise output) control signaling that indicates, identifies, or otherwise configures a set of parameters for wideband communications with the UE in accordance with a TDD pattern. The UE may be indicated or otherwise configured to be in such efficient scheduling mode (e.g., the wideband communication scheduling mode) using RRC or MAC-CE signaling. The TDD pattern may generally identify or otherwise define a first time period during which scheduling the UE for wideband communications is available and a second time period during which scheduling the UE for wideband communications is not available. The UE may operate in accordance with the TDD pattern or duty cycle.

In the non-limiting example shown in FIG. 4, this may include the first time period of the TDD pattern including a bundled set of scheduling opportunities during which scheduling the UE for wideband communications is available and the semi-static feedback codebook including a single feedback information for the bundled set of scheduling opportunities. That is, FIG. 4 illustrates a non-limiting example where time domain segmentation of the PDSCHs is configured for the UE with a corresponding one ACK/NACK bit being used in the Type 1 HARQ-ACK codebook for each bundled set. Again, gaps do not have any bits included in the codebook. Thus, in this example multiple candidate PDSCH monitoring occasions may be scheduled during each or some instances of the first time period.

For example, the UE may monitor for wideband communications scheduled during or for the first time period in accordance with the set of parameters. In the non-limiting example shown in FIG. 4, this may include the UE monitoring for a DCI grant 405 that schedules a first wideband downlink transmission (e.g., a first PDSCH 410). The UE may monitor for and receive the first PDSCH 410 in accordance with the set of parameters. The DCI grant 405 and the first PDSCH 410 may occur in a first slot or in separate non-contiguous slots. The UE may be operating in a first power state (e.g., a highest power state) while monitoring for and receiving the wideband communications during the first time period.

The UE may also monitor for a DCI grant 415 that schedules a second wideband downlink transmission (e.g., a second PDSCH 420). The UE may monitor for and receive the second PDSCH 420 in accordance with the set of parameters. The DCI grant 415 and the second PDSCH 420 may occur in a second slot or in separate non-contiguous slots. The UE may be operating in a first power state (e.g., a highest power state) while monitoring for and receiving the wideband communications during the first time period.

The UE may begin performing baseband processing of the first PDSCH 410 immediately after receiving the first PDSCH 410. The UE may, upon completion of the baseband processing of the first PDSCH 410, begin baseband processing of the second PDSCH 420. The UE may continue performing the baseband processing during a slot 425, a slot 430, a slot 435, and a slot 440. That is, the UE may begin performing baseband processing of the wideband communications scheduled during the first time period (e.g., the first PDSCH 410) during the first time period and continue the baseband processing during the second time period (e.g., for the second PDSCH 420). In some aspects, the baseband processing may be performed while the UE is operating at a second power level that is a lower power level than a first power level the UE is operating at during the first time period. For example, the UE may transition to a lower power state during the second time period during the baseband processing to conserve power.

Thus, in this example the first time period may include the time period during which the UE is scheduled for wideband communications (e.g., the first PDSCH 410 and the second PDSCH 420) according to the set of parameters. Thus, the first time period of the TDD pattern includes a bundled set of scheduling opportunities during which wideband scheduling the UE for wideband communications is available and used.

In this example the second time period may correspond to the time period of slot 425, slot 430, slot 435, and slot 440 during which scheduling the UE for wideband communications is unavailable. That is, even though slot 425, slot 430, slot 435, and slot 440 may be configured as available slots and would otherwise be considered candidate PDSCH reception or monitoring occasion, these slots are not available to schedule wideband communications with the UE according to the set of parameters. Thus, these slots may correspond to gaps in the TDD pattern during which the UE cannot be scheduled for wideband communications.

The TDD pattern or duty cycle may include another instance of the first time period corresponding to a slot 445 and a slot 450, during which the UE may monitor for a DCI grant in accordance with the set of parameters. However, in this instance the UE may not receive or otherwise detect a DCI grant during the slot 445 or the slot 450, and is therefore not scheduled for wideband communications during these slots. That is, even though slot 445 and slot 450 are configured as wideband communication slots and are candidate PDSCH reception or monitoring occasions, these slots are not used to schedule wideband communications with the UE. The TDD pattern may include another instance of the second time period during a slot 455 during which scheduling of wideband communications with the UE is not available.

Accordingly, the UE may transmit or otherwise output a semi-static feedback codebook associated with the wideband communications based on a result of the monitoring. For example, the UE may transmit the semi-static feedback codebook during a slot 460 using PUCCH resources configured during the slot 460. However, in some aspects the semi-static feedback codebook may include feedback information (e.g., ACK/NACK bits) for the wideband communications scheduled during the first time period and omit the feedback information for the second time period. For example, the semi-static feedback codebook (e.g., a Type 1 HARQ-ACK codebook) may include ACK/NACK bits corresponding to the candidate PDSCH monitoring occasions schedulable during the first time period and omit ACK/NACK bits corresponding to the candidate PDSCH monitoring occasions that would otherwise be, but are not, schedulable during the second time period. In this example, the semi-static feedback codebook includes a single feedback information bit for the bundled set of scheduling opportunities (e.g., for the first PDSCH 410 and the second PDSCH 420 that are bundled during the first instance of the first time period of the TDD pattern). The semi-static feedback codebook may include another single feedback information (e.g., a single bit, such as a single ACK/NACK bit, or some other singular indication of ACK/NACK information) for the bundled set of scheduling opportunities (e.g., for the slot 445 and the slot 450) even though no DCI was detected during those slots.

Figure 5:
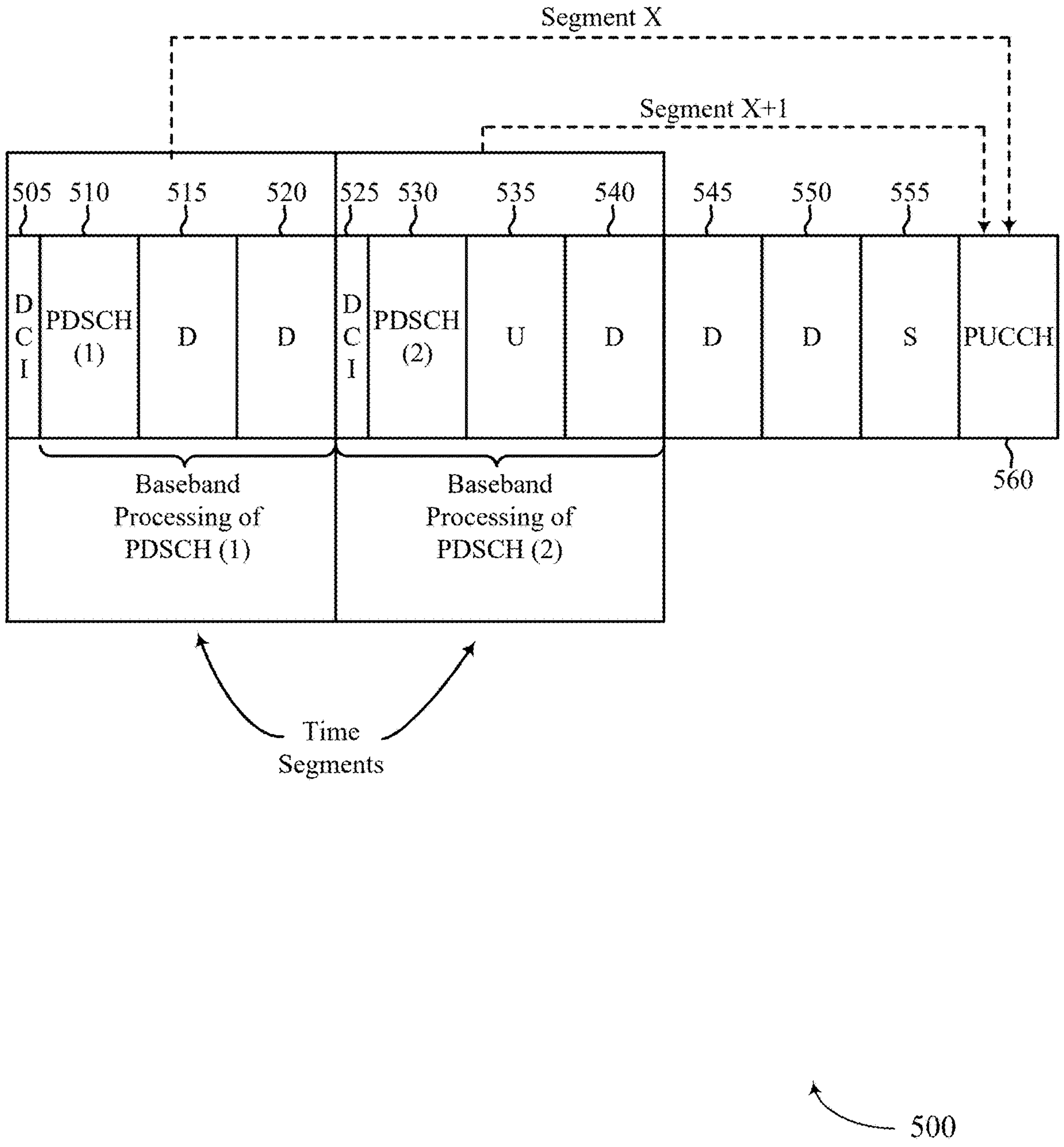
FIG. 5 shows an example of a feedback configuration that supports enhancements for semi-static codebook with efficient scheduling in accordance with one or more aspects of the present disclosure.

FIG. 5 shows an example of a feedback configuration 500 that supports enhancements for semi-static codebook with efficient scheduling in accordance with one or more aspects of the present disclosure. Feedback configuration 500 may implement aspects of wireless communications system 100 or aspects of feedback configuration 200, feedback configuration 300, or feedback configuration 400. Aspects of feedback configuration 500 may be implemented at or implemented by a UE or a network entity, which may be examples of the corresponding devices described herein.

As discussed above, aspects of the techniques described herein may optimize the semi-static HARQ-ACK codebook when the UE is scheduled with efficient scheduling (e.g., for wideband communications). Aspects of the techniques described herein provide for optimizations of the HARQ-ACK codebook in view of gaps associated with wideband communications. For example, the UE may receive or otherwise obtain (and the network entity may transmit or otherwise output) control signaling that indicates, identifies, or otherwise configures a set of parameters for wideband communications with the UE in accordance with a TDD pattern. The UE may be indicated or otherwise configured to be in such efficient scheduling mode (e.g., the wideband communication scheduling mode) using RRC or MAC-CE signaling. The TDD pattern may generally identify or otherwise define a first time period during which scheduling the UE for wideband communications is available and a second time period during which scheduling the UE for wideband communications is not available. The UE may operate in accordance with the TDD pattern or duty cycle.

In some aspects, this may include the set of parameters identifying a set of candidate scheduling offsets between the first time period and a transmission time associated with the semi-static feedback codebook. For example, the UE may be configured to be in the efficient scheduling mode (e.g., using RRC signaling, MAC-CE signaling, or using DCI signaling). In this scenario, the UE may add gaps to every scheduled PDSCH occasion, which may correspond to the baseband additional slots that are not schedulable being triggered/existing only with the scheduled DCI. Aspects of the techniques described herein provide various mechanisms to determine these invalid PDSCH slots (e.g., gaps) if they are dynamically indicated and dependent on the scheduled DCI. Aspects of the described techniques may decouple the identification of the gaps (e.g., where no bits are included in the codebook) from the scheduling DCIs.

As one example, this may include the second time period being identified based at least in part on the set of candidate scheduling offsets where the set of candidate scheduling offsets is a smaller set than a set of available scheduling offsets. For example, whenever the UE is indicated to be operating with efficient scheduling (e.g., low baseband), the set of K1 values (e.g., the set of available offsets) may be reduced to a subset of K1 values (e.g., the set of candidate scheduling offsets) where the Type 1 HARQ-ACK codebook size is reduced accordingly. For example, only certain K1 values may be applicable or otherwise indicated in the scheduling DCI (e.g., K1'={4,8,12}).

In another example, this may include the second time period being identified based at least in part on the set of candidate scheduling offsets where the set of candidate scheduling offsets includes one or more candidate scheduling offsets that exceed a scheduling offset threshold associated with the set of available scheduling offsets. For example, a few larger K1 values may be inserted into the scheduling DCI when the UE is indicated to be in the efficient scheduling mode (e.g., scheduled for wideband communications). For example, the set of candidate scheduling offsets may include K1={4, 8, 12, 15} where 15 is a larger K1 value that traditionally available for use in the scheduling DCI. In a TDD pattern of DDDDDDDSUU, when smaller candidates are removed, the larger candidates may be added as the last few D slots may need to point to the S/U slots in the next TDD pattern periodicity (e.g., K1=4,5, . . . , 15}).

FIG. 5 illustrates a non-limiting example of such gaps being introduced in the scheduling DCI where the time segments are defined as X slots wherein Y PDSCH(s) can be scheduled such that their baseband processing timeline is contained withing the X slots. In this example, in ever X=3 slot time segments only Y=1 PDSCH can be scheduled in the window. Thus, one ACK/NACK bit per segment may be used in the Type 1 HARQ-ACK codebook. In some cases, that Y=1 PDSCH may be scheduled in the first slot or, if scheduled in the second or third slot, the baseband processing may spill outside the time segment. This, in this example the TDD pattern may include a set of time segments where each time segment includes the first time period and the second time period. In this example, the UE may perform baseband processing during the second time period for the wideband communications received during the first time period. For example, the semi-static feedback codebook may include feedback information (e.g., a bit) for the first time period in each time segment of the set of time segments.

For example, the UE may monitor for wideband communications scheduled during or for the first time period of a first time segment (e.g., time segment X) in accordance with the set of parameters. In the non-limiting example shown in FIG. 5, this may include the UE monitoring for a DCI grant 505 that schedules a first wideband downlink transmission (e.g., a first PDSCH 510). The UE may monitor for and receive the first PDSCH 510 in accordance with the set of parameters. The DCI grant 505 and the first PDSCH 510 may occur in a first slot or in separate non-contiguous slots. The UE may be operating in a first power state (e.g., a highest power state) while monitoring for and receiving the wideband communications during the first time period.

The UE may begin performing baseband processing of the first PDSCH 510 immediately after receiving the first PDSCH 510 during the first time segment in the set of time segments. The UE may continue performing the baseband processing during a slot 515 and a slot 520, which correspond to the second time period of the first time segment. That is, the UE may begin performing baseband processing of the wideband communications scheduled during the first time period (e.g., the first PDSCH 510) during the first time period and continue the baseband processing during the second time period. Accordingly, in this example the baseband processing performed during the second time period may be constrained within the first time segment.

In some aspects, the baseband processing may be performed while the UE is operating at a second power level that is a lower power level than a first power level the UE is operating at during the first time period. For example, the UE may transition to a lower power state during the second time period during the baseband processing to conserve power.

The UE may monitor for wideband communications scheduled during or for the first time period of a second time segment (e.g., time segment X+1) in accordance with the set of parameters. In the non-limiting example shown in FIG. 5, this may include the UE monitoring for a DCI grant 525 that schedules a second wideband downlink transmission (e.g., a second PDSCH 530). The UE may monitor for and receive the second PDSCH 530 in accordance with the set of parameters. The DCI grant 525 and the second PDSCH 530 may occur in a first slot or in separate non-contiguous slots. The UE may be operating in a first power state (e.g., a highest power state) while monitoring for and receiving the wideband communications during the first time period.

The UE may begin performing baseband processing of the second PDSCH 530 immediately after receiving the second PDSCH 530 during the second time segment in the set of time segments. The UE may continue performing the baseband processing during a slot 535 and a slot 540, which correspond to the second time period of the second time segment. That is, the UE may begin performing baseband processing of the wideband communications scheduled during the first time period (e.g., the second PDSCH 530) during the first time period and continue the baseband processing during the second time period. Accordingly, in this example the baseband processing performed during the second time period may be constrained within the second time segment.

In some aspects, the baseband processing may be performed while the UE is operating at a second power level that is a lower power level than a first power level the UE is operating at during the first time period. For example, the UE may transition to a lower power state during the second time period during the baseband processing to conserve power. In this example, the slot 545 and the slot 550 may not be used for scheduling communications with the UE. The slot 555 may be a special slot that is also not used for scheduling communications with the UE.

Accordingly, the UE may transmit or otherwise output a semi-static feedback codebook associated with the wideband communications based on a result of the monitoring. For example, the UE may transmit the semi-static feedback codebook during a slot 560 using PUCCH resources configured during the slot 560. However, in some aspects the semi-static feedback codebook may include feedback information (e.g., ACK/NACK bits) for the wideband communications scheduled during the first time period of each time segment and omit the feedback information for the second time period of each time segment. For example, the semi-static feedback codebook (e.g., a Type 1 HARQ-ACK codebook) may include ACK/NACK bits corresponding to the candidate PDSCH monitoring occasions schedulable during the first time period of the first time segment (X) and the second time segment (X+1) and omit ACK/NACK bits corresponding to the candidate PDSCH monitoring occasions that would otherwise be, but are not, schedulable during the second time period of the first time segment (X) and the second time segment (X+1). In this example, the semi-static feedback codebook includes a single feedback information bit for each time segment corresponding to the scheduling opportunities (e.g., for the first PDSCH 510 and the second PDSCH 530 that are scheduling during each time segment according to the TDD pattern).

Figure 6:
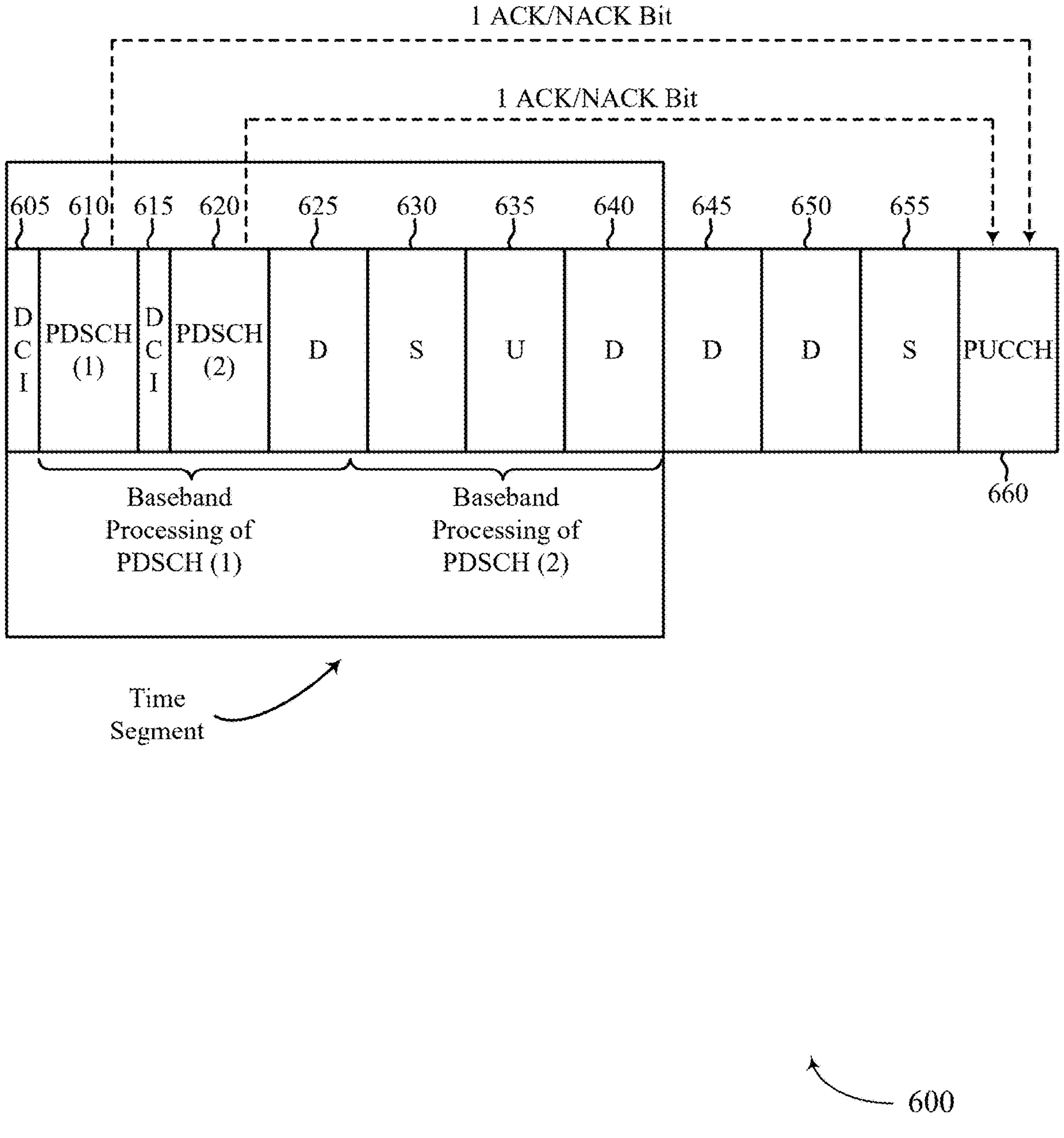
FIG. 6 shows an example of a feedback configuration that supports enhancements for semi-static codebook with efficient scheduling in accordance with one or more aspects of the present disclosure.

FIG. 6 shows an example of a feedback configuration 600 that supports enhancements for semi-static codebook with efficient scheduling in accordance with one or more aspects of the present disclosure. Feedback configuration 600 may implement aspects of wireless communications system 100 or aspects of feedback configuration 200, feedback configuration 300, feedback configuration 400, or feedback configuration 500. Aspects of feedback configuration 600 may be implemented at or implemented by a UE or a network entity, which may be examples of the corresponding devices described herein.

As discussed above, aspects of the techniques described herein may optimize the semi-static HARQ-ACK codebook when the UE is scheduled with efficient scheduling (e.g., for wideband communications). Aspects of the techniques described herein provide for optimizations of the HARQ-ACK codebook in view of gaps associated with wideband communications. For example, the UE may receive or otherwise obtain (and the network entity may transmit or otherwise output) control signaling that indicates, identifies, or otherwise configures a set of parameters for wideband communications with the UE in accordance with a TDD pattern. The UE may be indicated or otherwise configured to be in such efficient scheduling mode (e.g., the wideband communication scheduling mode) using RRC or MAC-CE signaling. The TDD pattern may generally identify or otherwise define a first time period during which scheduling the UE for wideband communications is available and a second time period during which scheduling the UE for wideband communications is not available. The UE may operate in accordance with the TDD pattern or duty cycle.

In some aspects, this may include the set of parameters identifying a set of candidate scheduling offsets between the first time period and a transmission time associated with the semi-static feedback codebook. For example, the UE may be configured to be in the efficient scheduling mode (e.g., using RRC signaling, MAC-CE signaling, or using DCI signaling). In this scenario, the UE may add gaps (e.g., the second time period) to every scheduled PDSCH occasion, which may correspond to the baseband additional slots that are not schedulable being triggered/existing only with the scheduled DCI. Aspects of the techniques described herein provide various mechanisms to determine these invalid PDSCH slots (e.g., gaps) if they are dynamically indicated and dependent on the scheduled DCI. Aspects of the described techniques may decouple the identification of the gaps (e.g., where no bits are included in the codebook) from the scheduling DCIs.

As one example, this may include the second time period being identified based at least in part on the set of candidate scheduling offsets where the set of candidate scheduling offsets is a smaller set than a set of available scheduling offsets. For example, whenever the UE is indicated to be operating with efficient scheduling (e.g., low baseband), the set of K1 values (e.g., the set of available offsets) may be reduced to a subset of K1 values (e.g., the set of candidate scheduling offsets) where the Type 1 HARQ-ACK codebook size is reduced accordingly. For example, only certain K1 values may be applicable or otherwise indicated in the scheduling DCI (e.g., K1'={4,8,12}).

In another example, this may include the second time period being identified based at least in part on the set of candidate scheduling offsets where the set of candidate scheduling offsets includes one or more candidate scheduling offsets that exceed a scheduling offset threshold associated with the set of available scheduling offsets. For example, a few larger K1 values may be inserted into the scheduling DCI when the UE is indicated to be in the efficient scheduling mode (e.g., scheduled for wideband communications). For example, the set of candidate scheduling offsets may include K1={4, 8, 12, 15} where 15 is a larger K1 value that traditionally available for use in the scheduling DCI. In a TDD pattern of DDDDDDDSUU, when smaller candidates are removed, the larger candidates may be added as the last few D slots may need to point to the S/U slots in the next TDD pattern periodicity (e.g., K1=4,5, . . . , 15}).

FIG. 5 illustrates a non-limiting example of such gaps being introduced in the scheduling DCI where the time segments are defined as X slots wherein Y PDSCH(s) can be scheduled such that their baseband processing timeline is contained withing the X slots. In this example, in ever X=6 slot time segments only Y=3 PDSCH can be scheduled in the window if the baseband processing takes three slots and may end by the sixth slot. Thus, the two PDSCHs may be on any of the first three slots. One ACK/NACK bit per PDSCH may be used in the Type 1 HARQ-ACK codebook. Thus, in this example the TDD pattern may include a set of time segments where each time segment includes the first time period and the second time period. In this example, the UE may perform baseband processing during the second time period for the wideband communications received during the first time period. For example, the semi-static feedback codebook may include feedback information (e.g., a bit) for the first time period in each time segment of the set of time segments.

For example, the UE may monitor for wideband communications scheduled during or for the first time period of a first time segment in accordance with the set of parameters. In the non-limiting example shown in FIG. 6, this may include the UE monitoring for a DCI grant 605 that schedules a first wideband downlink transmission (e.g., a first PDSCH 610). The UE may monitor for and receive the first PDSCH 610 in accordance with the set of parameters. The DCI grant 605 and the first PDSCH 610 may occur in a first slot or in separate non-contiguous slots. The UE may monitor for a DCI grant 615 that schedules a second wideband downlink transmission (e.g., a second PDSCH 620). The UE may monitor for and receive the second PDSCH 620 in accordance with the set of parameters. The DCI grant 615 and the second PDSCH 620 may occur in a first slot or in separate non-contiguous slots. The UE may be operating in a first power state (e.g., a highest power state) while monitoring for and receiving the wideband communications during the first time period. Thus, in this example where X=6 and Y=2, two PDSCHs are scheduled during the first time period of the time segment.

The UE may begin performing baseband processing of the first PDSCH 610 immediately after receiving the first PDSCH 610 during the time segment in the set of time segments. The UE may continue performing the baseband processing of the first PDSCH 610 and then begin baseband processing of the second PDSCH 620 during a slot 625, a slot 630, a slot 635, and a slot 640, which correspond to the second time period of the time segment. That is, the UE may begin performing baseband processing of the wideband communications scheduled during the first time period (e.g., the first PDSCH 610 and the second PDSCH 620) during the first time period and continue the baseband processing during the second time period. Accordingly, in this example the baseband processing performed during the second time period may be constrained within the time segment.

In some aspects, the baseband processing may be performed while the UE is operating at a second power level that is a lower power level than a first power level the UE is operating at during the first time period. For example, the UE may transition to a lower power state during the second time period during the baseband processing to conserve power. In this example, the slot 645, the slot 650, and the slot 655 may not be used for scheduling communications with the UE.

Accordingly, the UE may transmit or otherwise output a semi-static feedback codebook associated with the wideband communications based on a result of the monitoring. For example, the UE may transmit the semi-static feedback codebook during a slot 660 using PUCCH resources configured during the slot 660. However, in some aspects the semi-static feedback codebook may include feedback information (e.g., ACK/NACK bits) for the wideband communications scheduled during the first time period of each time segment and omit the feedback information for the second time period of each time segment. For example, the semi-static feedback codebook (e.g., a Type 1 HARQ-ACK codebook) may include ACK/NACK bits corresponding to the candidate PDSCH monitoring occasions schedulable during the first time period of the time segment and omit ACK/NACK bits corresponding to the candidate PDSCH monitoring occasions that would otherwise be, but are not, schedulable during the second time period of the time segment. In this example, the semi-static feedback codebook includes a single feedback information bit for each PDSCH (e.g., for the first PDSCH 610 and the second PDSCH 620) that are scheduling during the time segment according to the TDD pattern.

Figure 7:
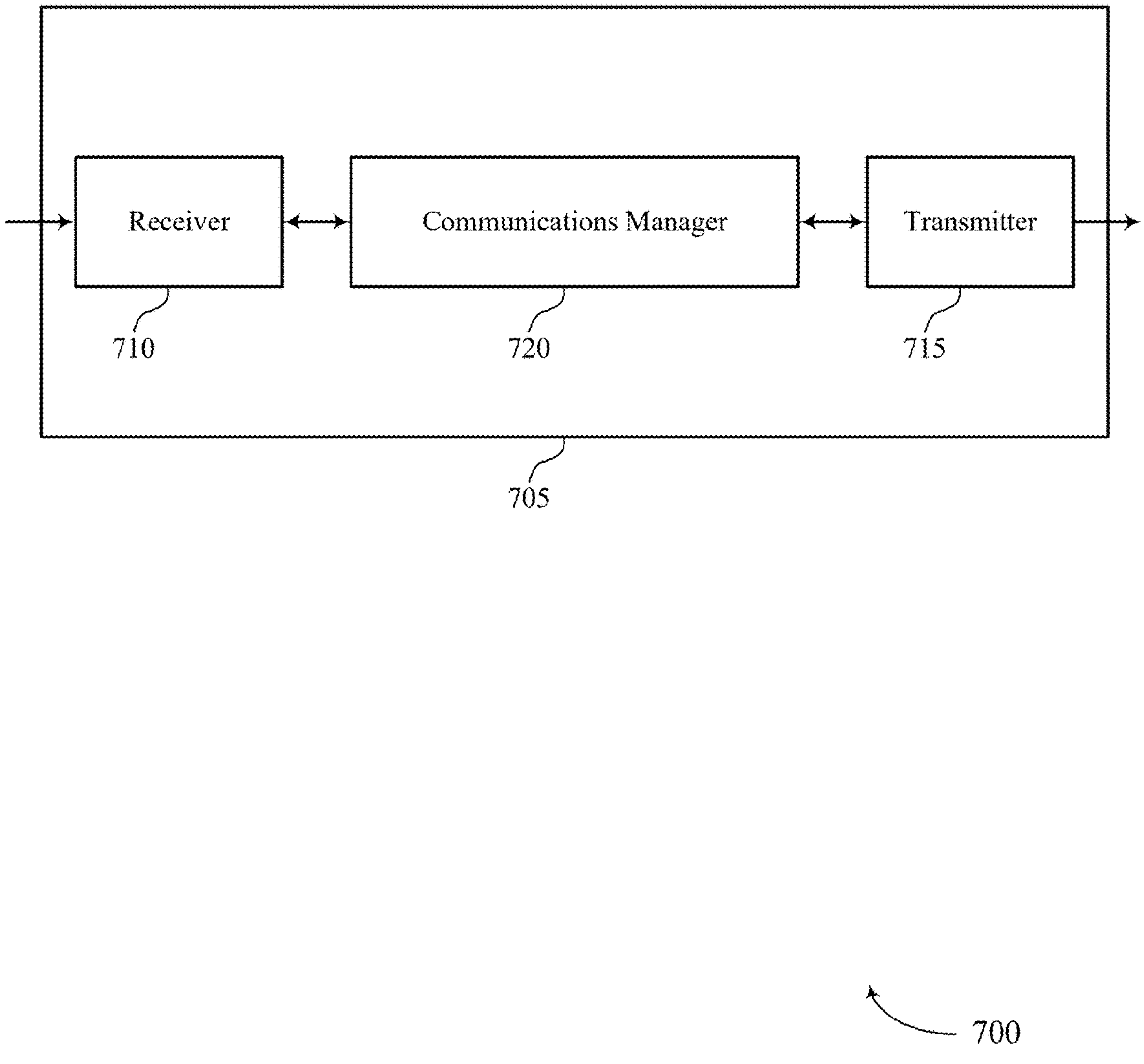
FIGS. 7 and 8 show block diagrams of devices that support enhancements for semi-static codebook with efficient scheduling in accordance with one or more aspects of the present disclosure.

FIG. 7 shows a block diagram 700 of a device 705 that supports enhancements for semi-static codebook with efficient scheduling in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to enhancements for semi-static codebook with efficient scheduling). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to enhancements for semi-static codebook with efficient scheduling). In some examples, the transmitter

715 may be co-located with a receiver 710 in a transceiver module. The transmitter 715 may utilize a single antenna or a set of multiple antennas.

The communications manager 720, the receiver 710, the transmitter 715, or various combinations or components thereof may be examples of means for performing various aspects of enhancements for semi-static codebook with efficient scheduling as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor (e.g., referred to as a processor-executable code). If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for receiving control signaling that indicates a set of parameters for wideband communication with the UE in accordance with a TDD pattern, the TDD pattern including a first time period during which scheduling the UE for wideband communication is available and a second time period during which scheduling the UE for wideband communication is not available. The communications manager 720 is capable of, configured to, or operable to support a means for monitoring for a wideband communication scheduled for the first time period in accordance with the set of parameters. The communications manager 720 is capable of, configured to, or operable to support a means for transmitting a semi-static feedback codebook associated with the wideband communication based on a result of the monitoring, where the semi-static feedback codebook includes feedback information for the wideband communication scheduled for the first time period and omits feedback information for the second time period.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for efficient Type 1 HARQ-ACK codebook design when a UE is scheduled for efficient communications (e.g., for wideband communications). This may include the UE including ACK/NACK bits for a first time period during which the UE is schedulable for the wideband communications and omitting the ACK/NACK bits for a second time period during which the UE is not schedulable for the wideband communications.

Figure 8:
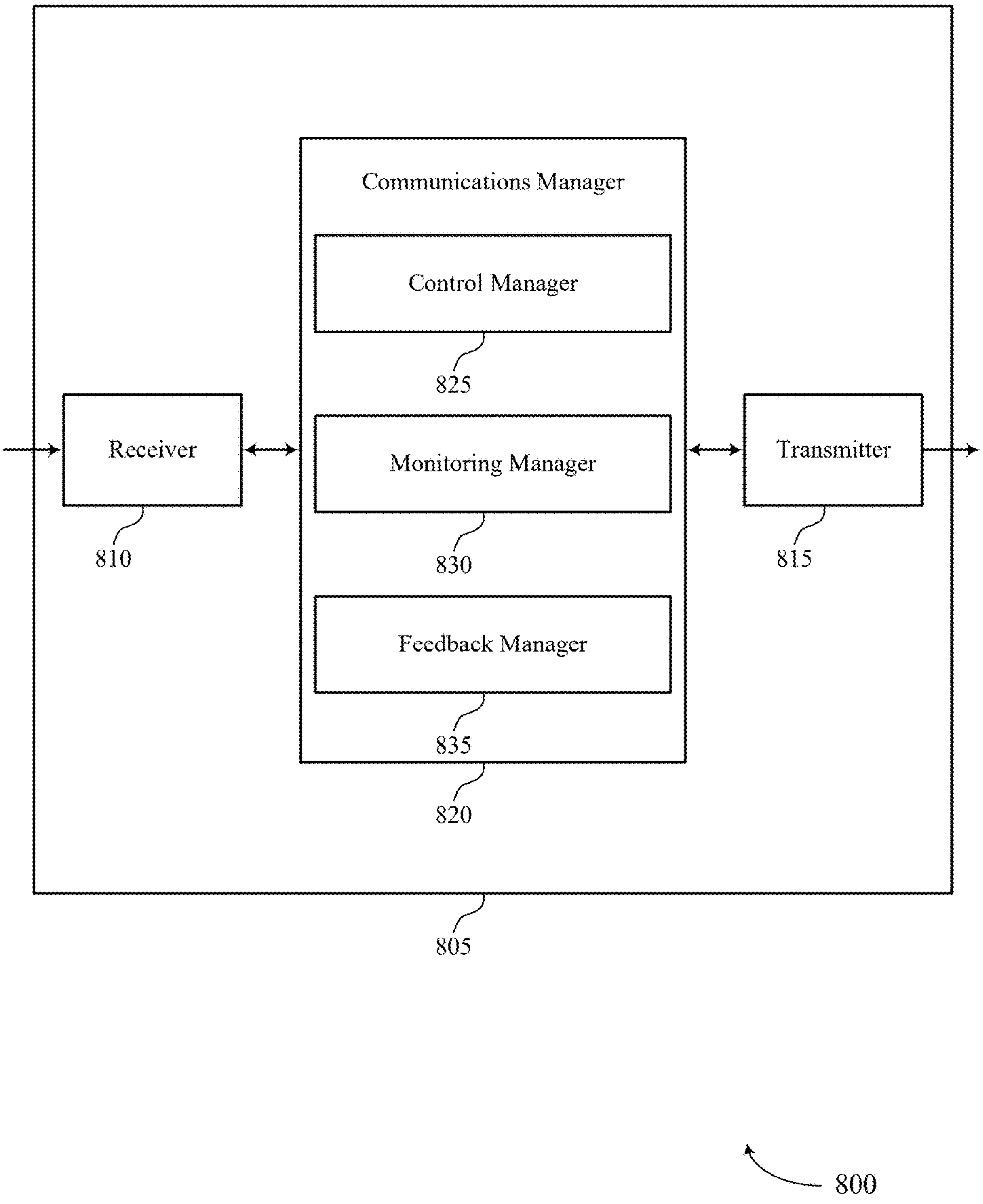

FIG. 8 shows a block diagram 800 of a device 805 that supports enhancements for semi-static codebook with efficient scheduling in accordance with one or more aspects of the present disclosure. The device 805 may be an example of aspects of a device 705 or a UE 115 as described herein. The device 805 may include a receiver 810, a transmitter 815, and a communications manager 820. The device 805, or one of more components of the device 805 (e.g., the receiver 810, the transmitter 815, the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to enhancements for semi-static codebook with efficient scheduling). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to enhancements for semi-static codebook with efficient scheduling). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of enhancements for semi-static codebook with efficient scheduling as described herein. For example, the communications manager 820 may include a control manager 825, a monitoring manager 830, a feedback manager 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The control manager 825 is capable of, configured to, or operable to support a means for receiving control signaling that indicates a set of parameters for wideband communication with the UE in accordance with a TDD pattern, the TDD pattern including a first time period during which scheduling the UE for wideband communication is available and a second time period during which scheduling the UE for wideband communication is not available. The monitoring manager 830 is capable of, configured to, or operable to support a means for monitoring for a wideband communication scheduled for the first time period in accordance with the set of parameters. The feedback manager 835 is capable of, configured to, or operable to support a means for transmitting a semi-static feedback codebook associated with the wideband communication based on a result of the monitoring, where the semi-static feedback codebook includes feedback information for the wideband communication scheduled for the first time period and omits feedback information for the second time period.

Figure 9:
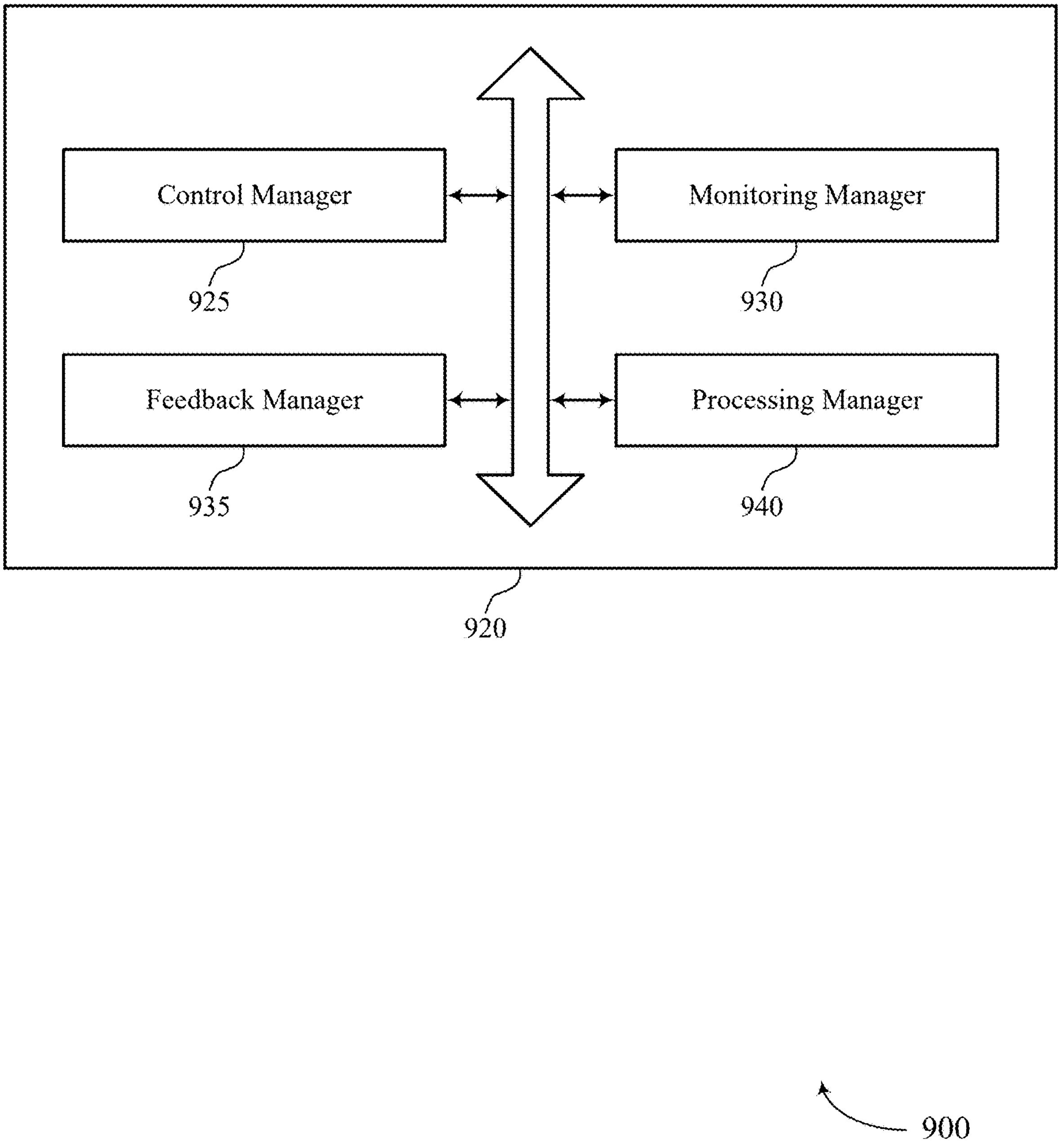
FIG. 9 shows a block diagram of a communications manager that supports enhancements for semi-static codebook with efficient scheduling in accordance with one or more aspects of the present disclosure.

FIG. 9 shows a block diagram 900 of a communications manager 920 that supports enhancements for semi-static codebook with efficient scheduling in accordance with one or more aspects of the present disclosure. The communications manager 920 may be an example of aspects of a communications manager 720, a communications manager 820, or both, as described herein. The communications manager 920, or various components thereof, may be an example of means for performing various aspects of enhancements for semi-static codebook with efficient scheduling as described herein. For example, the communications manager 920 may include a control manager 925, a monitoring manager 930, a feedback manager 935, a processing manager 940, or any combination thereof. Each of these components, or components or subcomponents thereof (e.g., one or more processors, one or more memories), may communicate, directly or indirectly, with one another (e.g., via one or more buses).

The communications manager 920 may support wireless communications in accordance with examples as disclosed herein. The control manager 925 is capable of, configured to, or operable to support a means for receiving control signaling that indicates a set of parameters for wideband communication with the UE in accordance with a TDD pattern, the TDD pattern including a first time period during which scheduling the UE for wideband communication is available and a second time period during which scheduling the UE for wideband communication is not available. The monitoring manager 930 is capable of, configured to, or operable to support a means for monitoring for a wideband communication scheduled for the first time period in accordance with the set of parameters. The feedback manager 935 is capable of, configured to, or operable to support a means for transmitting a semi-static feedback codebook associated with the wideband communication based on a result of the monitoring, where the semi-static feedback codebook includes feedback information for the wideband communication scheduled for the first time period and omits feedback information for the second time period.

In some examples, the first time period of the TDD pattern includes a set of multiple scheduling opportunities during which scheduling the UE for wideband communications is available and the semi-static feedback codebook includes separate feedback information for each scheduling opportunity included in the set of multiple scheduling opportunities. In some examples, the first time period of the TDD pattern includes a bundled set of scheduling opportunities during which scheduling the UE for wideband communications is available and the semi-static feedback codebook includes a single feedback information for the bundled set of scheduling opportunities.

In some examples, the processing manager 940 is capable of, configured to, or operable to support a means for performing, during the second time period, baseband processing for the wideband communication scheduled during the first time period. In some examples, the baseband processing is performed while the UE is operating at a second power level that is a lower power level than a first power level the UE is operating at during the first time period.

In some examples, the set of parameters identifies a set of candidate scheduling offsets between the first time period and a transmission time associated with the semi-static feedback codebook, the second time period is identified based on the set of candidate scheduling offsets, and the set of candidate scheduling offsets is a smaller set than a set of available scheduling offsets. In some examples, the set of parameters identifies a set of candidate scheduling offsets between the first time period and a transmission time associated with the semi-static feedback codebook, the second time period is identified based on the set of candidate scheduling offsets, and the set of candidate scheduling offsets includes one or more candidate scheduling offsets that exceed a scheduling offset threshold associated with a set of available scheduling offsets.

In some examples, the TDD pattern includes a set of time segments, each time segment including the first time period during which scheduling the UE for wideband communication is available and the second time period during which the UE performs baseband processing of the wideband communication received during the first time period. In some examples, the semi-static feedback codebook includes feedback information for the first time period in each time segment.

Figure 10:
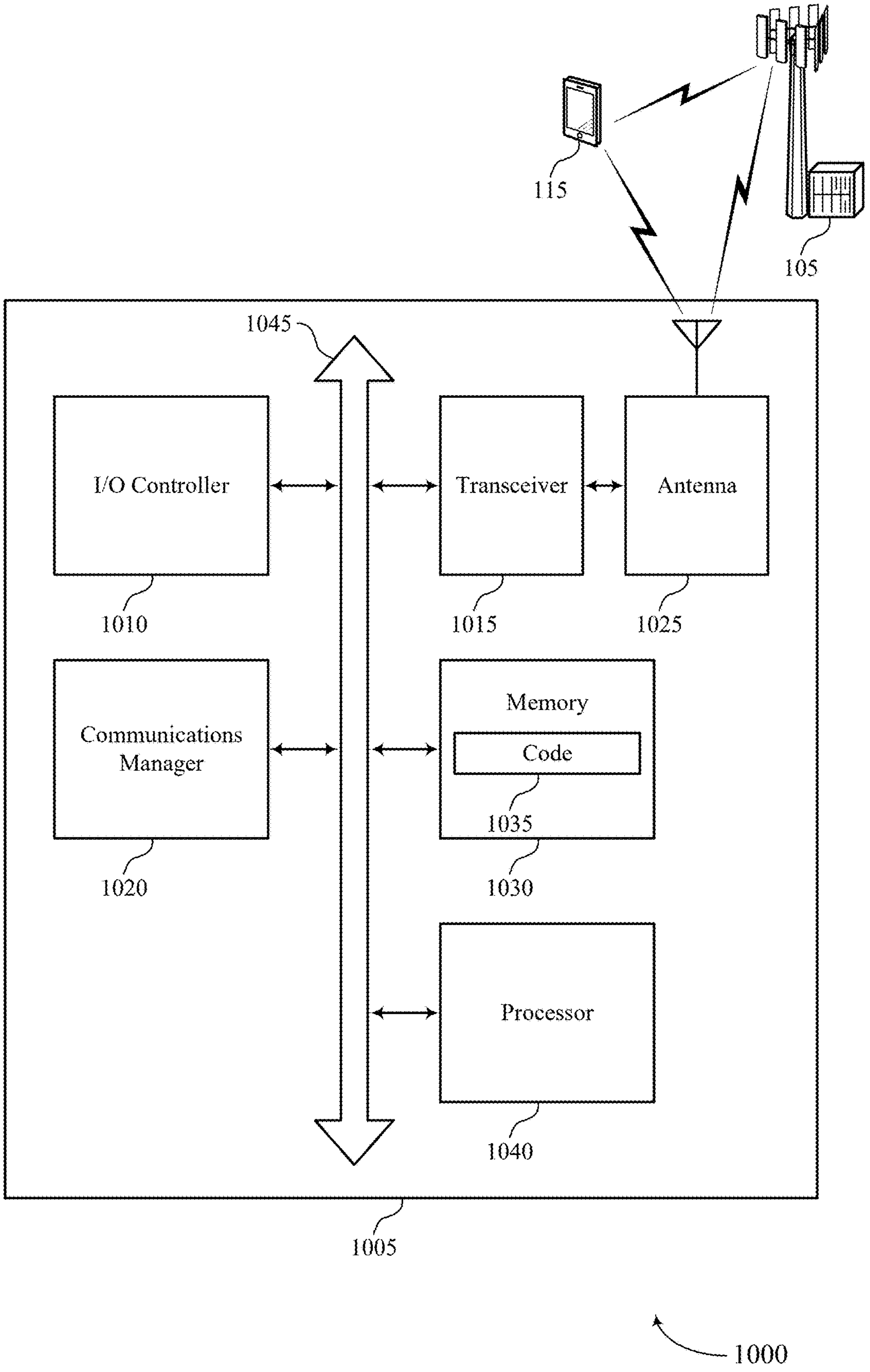
FIG. 10 shows a diagram of a system including a device that supports enhancements for semi-static codebook with efficient scheduling in accordance with one or more aspects of the present disclosure.

FIG. 10 shows a diagram of a system 1000 including a device 1005 that supports enhancements for semi-static codebook with efficient scheduling in accordance with one or more aspects of the present disclosure. The device 1005 may be an example of or include components of a device 705, a device 805, or a UE 115 as described herein. The device 1005 may communicate (e.g., wirelessly) with one or more other devices (e.g., network entities 105, UEs 115, or a combination thereof). The device 1005 may include components for bi-directional voice and data communications including components for transmitting and receiving communications, such as a communications manager 1020, an input/output (I/O) controller, such as an I/O controller 1010, a transceiver 1015, one or more antennas 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna. However, in some other cases, the device 1005 may have more than one antenna, which may be capable of concurrently transmitting or receiving multiple wireless transmissions. The transceiver 1015 may communicate bi-directionally via the one or more antennas 1025 using wired or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable, or processor-executable code, such as the code 1035. The code 1035 may include instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may include, among other things, a basic I/O system (BIOS) which may control basic hardware or software operation such as the interaction with peripheral components or devices.

The at least one processor 1040 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting enhancements for semi-static codebook with efficient scheduling). For example, the device 1005 or a component of the device 1005 may include at least one processor 1040 and at least one memory 1030 coupled with or to the at least one processor 1040, the at least one processor 1040 and the at least one memory 1030 configured to perform various functions described herein.

In some examples, the at least one processor 1040 may include multiple processors and the at least one memory 1030 may include multiple memories. One or more of the multiple processors may be coupled with one or more of the multiple memories, which may, individually or collectively, be configured to perform various functions described herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. For example, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code 1035 (e.g., processor-executable code) stored in the at least one memory 1030 or otherwise, to perform one or more of the functions described herein.

The communications manager 1020 may support wireless communications in accordance with examples as disclosed herein. For example, the communications manager 1020 is capable of, configured to, or operable to support a means for receiving control signaling that indicates a set of parameters for wideband communication with the UE in accordance with a TDD pattern, the TDD pattern including a first time period during which scheduling the UE for wideband communication is available and a second time period during which scheduling the UE for wideband communication is not available. The communications manager 1020 is capable of, configured to, or operable to support a means for monitoring for a wideband communication scheduled for the first time period in accordance with the set of parameters. The communications manager 1020 is capable of, configured to, or operable to support a means for transmitting a semi-static feedback codebook associated with the wideband communication based on a result of the monitoring, where the semi-static feedback codebook includes feedback information for the wideband communication scheduled for the first time period and omits feedback information for the second time period.

By including or configuring the communications manager 1020 in accordance with examples as described herein, the device 1005 may support techniques for efficient Type 1 HARQ-ACK codebook design when a UE is scheduled for efficient communications (e.g., for wideband communications). This may include the UE including ACK/NACK bits for a first time period during which the UE is schedulable for the wideband communications and omitting the ACK/NACK bits for a second time period during which the UE is not schedulable for the wideband communications.

In some examples, the communications manager 1020 may be configured to perform various operations (e.g., receiving, monitoring, transmitting) using or otherwise in cooperation with the transceiver 1015, the one or more antennas 1025, or any combination thereof. For example, the communications manager 1020 may be configured to receive or transmit messages or other signaling as described herein via the transceiver 1015. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of enhancements for semi-static codebook with efficient scheduling as described herein, or the at least one processor 1040 and the at least one memory 1030 may be otherwise configured to, individually or collectively, perform or support such operations.

Figure 11:
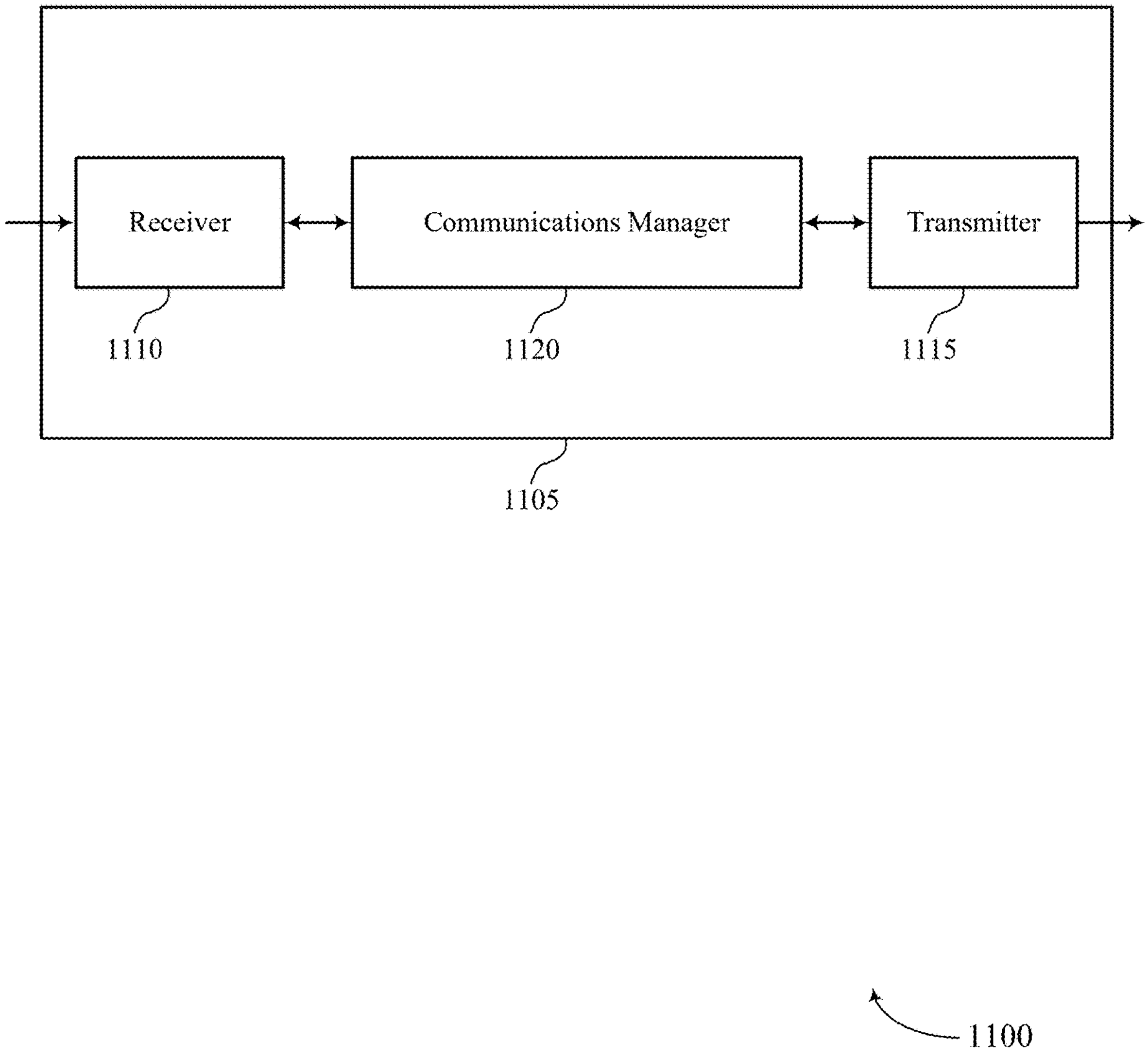
FIGS. 11 and 12 show block diagrams of devices that support enhancements for semi-static codebook with efficient scheduling in accordance with one or more aspects of the present disclosure.

FIG. 11 shows a block diagram 1100 of a device 1105 that supports enhancements for semi-static codebook with efficient scheduling in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations or components thereof may be examples of means for performing various aspects of enhancements for semi-static codebook with efficient scheduling as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor (e.g., referred to as a processor-executable code). If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 is capable of, configured to, or operable to support a means for outputting, to a UE, control signaling that indicates a set of parameters for wideband communication with the UE in accordance with a TDD pattern, the TDD pattern including a first time period during which scheduling the UE for wideband communication is available and a second time period during which scheduling the UE for wideband communication is not available. The communications manager 1120 is capable of, configured to, or operable to support a means for outputting a wideband communication to the UE scheduled for the first time period in accordance with the set of parameters. The communications manager 1120 is capable of, configured to, or operable to support a means for obtaining a semi-static feedback codebook associated with the wideband communication from the UE, where the semi-static feedback codebook includes feedback information for the wideband communication scheduled for the first time period and omits feedback information for the second time period.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for efficient Type 1 HARQ-ACK codebook design when a UE is scheduled for efficient communications (e.g., for wideband communications). This may include the UE including ACK/NACK bits for a first time period during which the UE is schedulable for the wideband communications and omitting the ACK/NACK bits for a second time period during which the UE is not schedulable for the wideband communications.

Figure 12:
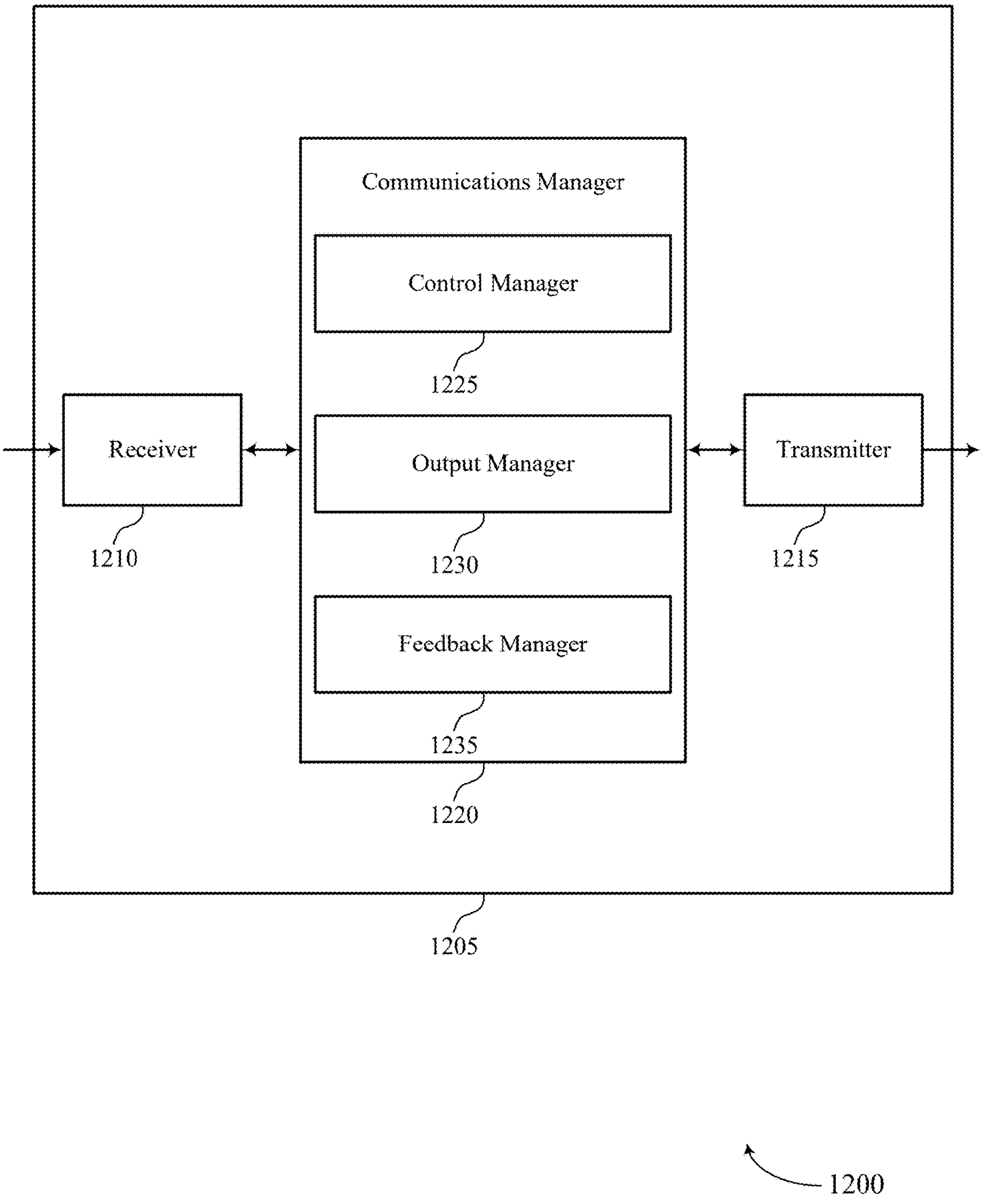

FIG. 12 shows a block diagram 1200 of a device 1205 that supports enhancements for semi-static codebook with efficient scheduling in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one of more components of the device 1205 (e.g., the receiver 1210, the transmitter 1215, the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of enhancements for semi-static codebook with efficient scheduling as described herein. For example, the communications manager 1220 may include a control manager 1225, an output manager 1230, a feedback manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The control manager 1225 is capable of, configured to, or operable to support a means for outputting, to a UE, control signaling that indicates a set of parameters for wideband communication with the UE in accordance with a TDD pattern, the TDD pattern including a first time period during which scheduling the UE for wideband communication is available and a second time period during which scheduling the UE for wideband communication is not available. The output manager 1230 is capable of, configured to, or operable to support a means for outputting a wideband communication to the UE scheduled for the first time period in accordance with the set of parameters. The feedback manager 1235 is capable of, configured to, or operable to support a means for obtaining a semi-static feedback codebook associated with the wideband communication from the UE, where the semi-static feedback codebook includes feedback information for the wideband communication scheduled for the first time period and omits feedback information for the second time period.

Figure 13:
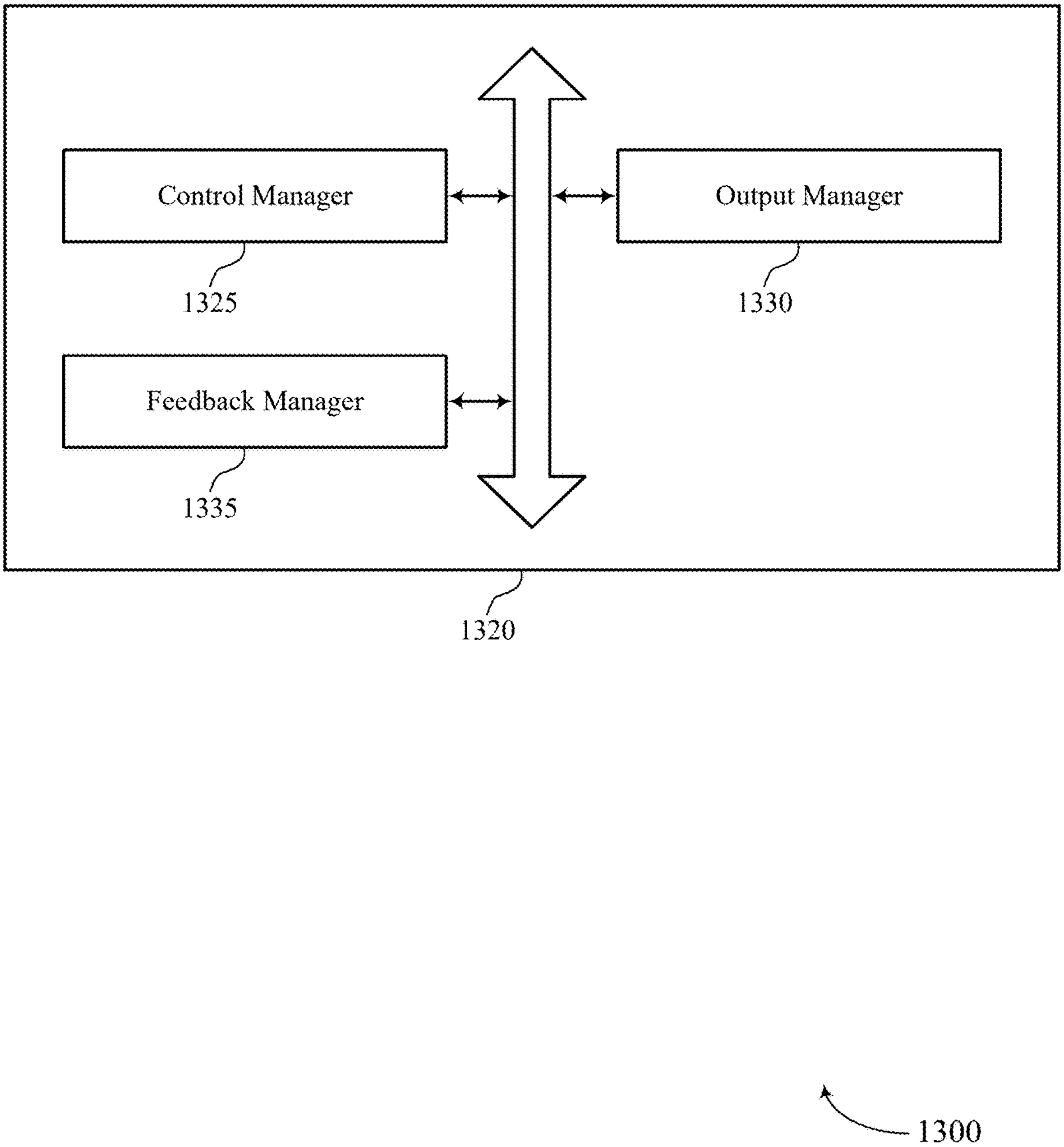
FIG. 13 shows a block diagram of a communications manager that supports enhancements for semi-static codebook with efficient scheduling in accordance with one or more aspects of the present disclosure.

FIG. 13 shows a block diagram 1300 of a communications manager 1320 that supports enhancements for semi-static codebook with efficient scheduling in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of enhancements for semi-static codebook with efficient scheduling as described herein. For example, the communications manager 1320 may include a control manager 1325, an output manager 1330, a feedback manager 1335, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications in accordance with examples as disclosed herein. The control manager 1325 is capable of, configured to, or operable to support a means for outputting, to a UE, control signaling that indicates a set of parameters for wideband communication with the UE in accordance with a TDD pattern, the TDD pattern including a first time period during which scheduling the UE for wideband communication is available and a second time period during which scheduling the UE for wideband communication is not available. The output manager 1330 is capable of, configured to, or operable to support a means for outputting a wideband communication to the UE scheduled for the first time period in accordance with the set of parameters. The feedback manager 1335 is capable of, configured to, or operable to support a means for obtaining a semi-static feedback codebook associated with the wideband communication from the UE, where the semi-static feedback codebook includes feedback information for the wideband communication scheduled for the first time period and omits feedback information for the second time period.

In some examples, the first time period of the TDD pattern includes a set of multiple scheduling opportunities during which scheduling the UE for wideband communications is available and the semi-static feedback codebook includes separate feedback information for each scheduling opportunity included in the set of multiple scheduling opportunities. In some examples, the first time period of the TDD pattern includes a bundled set of scheduling opportunities during which scheduling the UE for wideband communications is available and the semi-static feedback codebook includes a single feedback information for the bundled set of scheduling opportunities.

In some examples, the set of parameters identifies a set of candidate scheduling offsets between the first time period and a transmission time associated with the semi-static feedback codebook, the second time period is identified based on the set of candidate scheduling offsets, and the set of candidate scheduling offsets is a smaller set than a set of available scheduling offsets. In some examples, the set of parameters identifies a set of candidate scheduling offsets between the first time period and a transmission time associated with the semi-static feedback codebook, the second time period is identified based on the set of candidate scheduling offsets, and the set of candidate scheduling offsets includes one or more candidate scheduling offsets that exceed a scheduling offset threshold associated with a set of available scheduling offsets.

In some examples, the TDD pattern includes a set of time segments, each time segment including the first time period during which scheduling the UE for wideband communication is available and the second time period during which the UE performs baseband processing of the wideband communication received during the first time period. In some examples, the semi-static feedback codebook includes feedback information for the first time period in each time segment.

Figure 14:
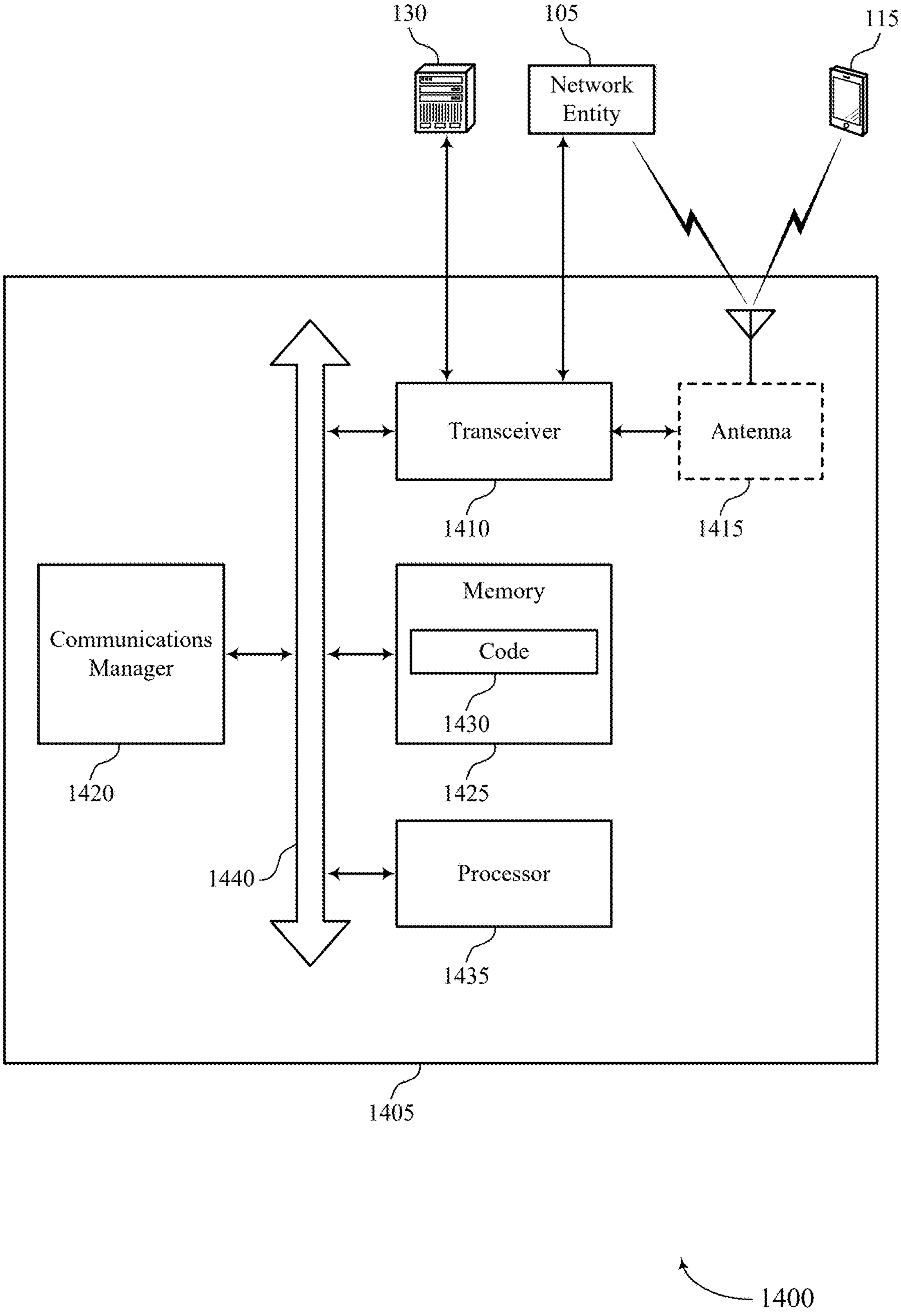
FIG. 14 shows a diagram of a system including a device that supports enhancements for semi-static codebook with efficient scheduling in accordance with one or more aspects of the present disclosure.

FIG. 14 shows a diagram of a system 1400 including a device 1405 that supports enhancements for semi-static codebook with efficient scheduling in accordance with one or more aspects of the present disclosure. The device 1405 may be an example of or include components of a device 1105, a device 1205, or a network entity 105 as described herein. The device 1405 may communicate with other network devices or network equipment such as one or more of the network entities 105, UEs 115, or any combination thereof. The communications may include communications over one or more wired interfaces, over one or more wireless interfaces, or any combination thereof. The device 1405 may include components that support outputting and obtaining communications, such as a communications manager 1420, a transceiver 1410, one or more antennas 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., communication link(s) 125, backhaul communication link(s) 120, a midhaul communication link 162, a fronthaul communication link 168).

The at least one memory 1425 may include RAM, ROM, or any combination thereof. The at least one memory 1425 may store computer-readable, computer-executable, or processor-executable code, such as the code 1430. The code 1430 may include instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may include, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting enhancements for semi-static codebook with efficient scheduling). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425).

In some examples, the at least one processor 1435 may include multiple processors and the at least one memory 1425 may include multiple memories. One or more of the multiple processors may be coupled with one or more of the multiple memories, which may, individually or collectively, be configured to perform various functions herein. In some examples, the at least one processor 1435 may be a component of a processing system, which may refer to a system (such as a series) of machines, circuitry (including, for example, one or both of processor circuitry (which may include the at least one processor 1435) and memory circuitry (which may include the at least one memory 1425)), or components, that receives or obtains inputs and processes the inputs to produce, generate, or obtain a set of outputs. The processing system may be configured to perform one or more of the functions described herein. For example, the at least one processor 1435 or a processing system including the at least one processor 1435 may be configured to, configurable to, or operable to cause the device 1405 to perform one or more of the functions described herein. Further, as described herein, being "configured to," being "configurable to," and being "operable to" may be used interchangeably and may be associated with a capability, when executing code stored in the at least one memory 1425 or otherwise, to perform one or more of the functions described herein.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with one or more other network entities 105 and may include a controller or scheduler for controlling communications with UEs 115 (e.g., in cooperation with the one or more other network devices). In some examples, the communications manager 1420 may support an X2 interface within an LTE/LTE-A wireless communications network technology to provide communication between network entities 105.

The communications manager 1420 may support wireless communications in accordance with examples as disclosed herein. For example, the communications manager 1420 is capable of, configured to, or operable to support a means for outputting, to a UE, control signaling that indicates a set of parameters for wideband communication with the UE in accordance with a TDD pattern, the TDD pattern including a first time period during which scheduling the UE for wideband communication is available and a second time period during which scheduling the UE for wideband communication is not available. The communications manager 1420 is capable of, configured to, or operable to support a means for outputting a wideband communication to the UE scheduled for the first time period in accordance with the set of parameters. The communications manager 1420 is capable of, configured to, or operable to support a means for obtaining a semi-static feedback codebook associated with the wideband communication from the UE, where the semi-static feedback codebook includes feedback information for the wideband communication scheduled for the first time period and omits feedback information for the second time period.

By including or configuring the communications manager 1420 in accordance with examples as described herein, the device 1405 may support techniques for efficient Type 1 HARQ-ACK codebook design when a UE is scheduled for efficient communications (e.g., for wideband communications). This may include the UE including ACK/NACK bits for a first time period during which the UE is schedulable for the wideband communications and omitting the ACK/NACK bits for a second time period during which the UE is not schedulable for the wideband communications.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. For example, the communications manager 1420 may be configured to receive or transmit messages or other signaling as described herein via the transceiver 1410. Although the communications manager 1420 is illustrated as a separate component, in some examples, one or more functions described with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 to cause the device 1405 to perform various aspects of enhancements for semi-static codebook with efficient scheduling as described herein, or the at least one processor 1435 and the at least one memory 1425 may be otherwise configured to, individually or collectively, perform or support such operations.

Figure 15:
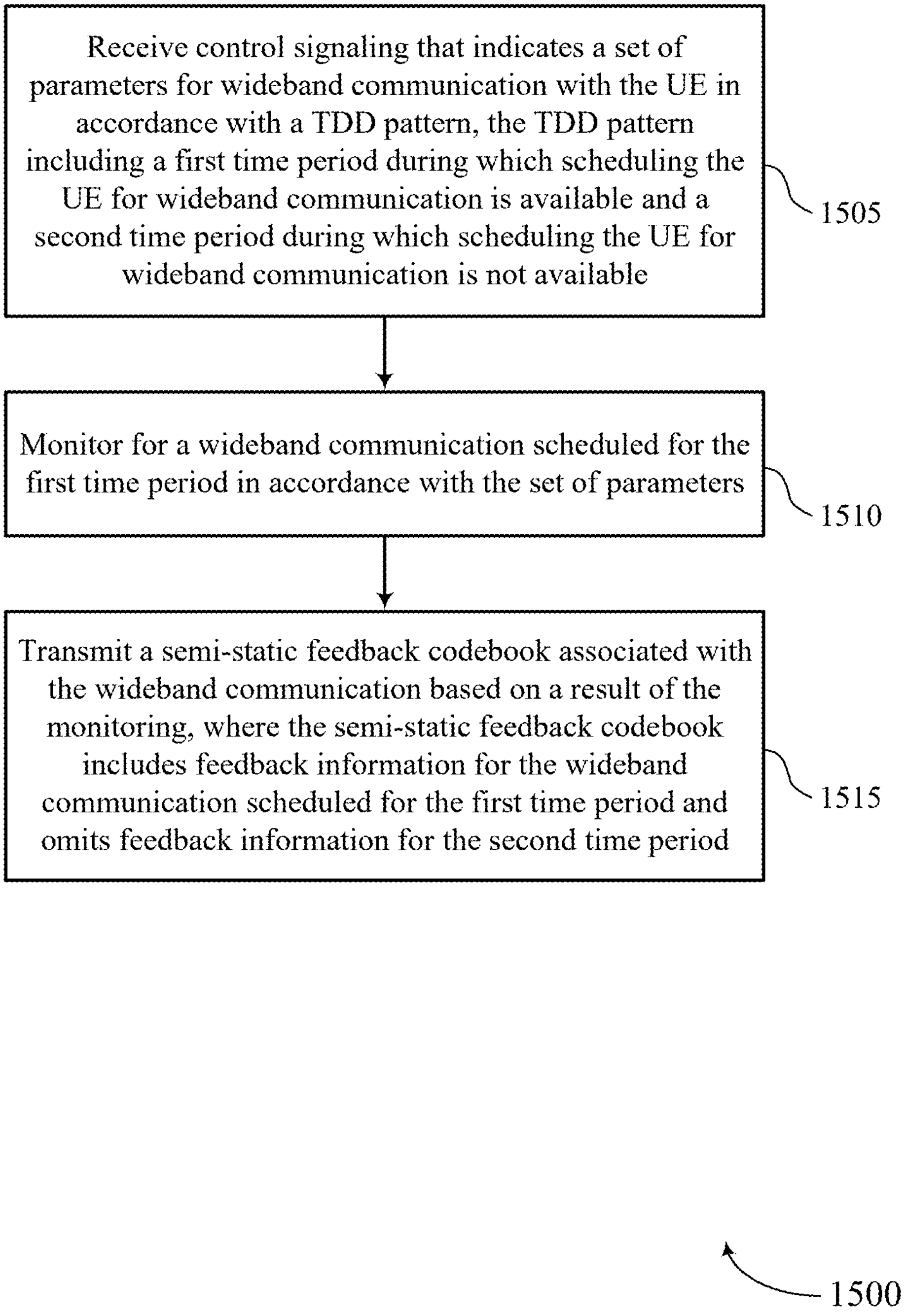
FIGS. 15 through 17 show flowcharts illustrating methods that support enhancements for semi-static codebook with efficient scheduling in accordance with one or more aspects of the present disclosure.

FIG. 15 shows a flowchart illustrating a method 1500 that supports enhancements for semi-static codebook with efficient scheduling in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving control signaling that indicates a set of parameters for wideband communication with the UE in accordance with a TDD pattern, the TDD pattern including a first time period during which scheduling the UE for wideband communication is available and a second time period during which scheduling the UE for wideband communication is not available. The operations of 1505 may be performed in accordance with examples as disclosed herein. In some examples, aspects of the operations of 1505 may be performed by a control manager 925 as described with reference to FIG. 9. Additionally, or alternatively, means for performing 1505 may, but not necessarily, include, for example, antenna 1025, transceiver 1015, communications manager 1020, memory 1030 (including code 1035), processor 1040, and/or bus 1045.

At 1510, the method may include monitoring for a wideband communication scheduled for the first time period in accordance with the set of parameters. The operations of 1510 may be performed in accordance with examples as disclosed herein. In some examples, aspects of the operations of 1510 may be performed by a monitoring manager 930 as described with reference to FIG. 9. Additionally, or alternatively, means for performing 1510 may, but not necessarily, include, for example, antenna 1025, transceiver 1015, communications manager 1020, memory 1030 (including code 1035), processor 1040, and/or bus 1045.

At 1515, the method may include transmitting a semi-static feedback codebook associated with the wideband communication based on a result of the monitoring, where the semi-static feedback codebook includes feedback information for the wideband communication scheduled for the first time period and omits feedback information for the second time period. The operations of 1515 may be performed in accordance with examples as disclosed herein. In some examples, aspects of the operations of 1515 may be performed by a feedback manager 935 as described with reference to FIG. 9. Additionally, or alternatively, means for performing 1515 may, but not necessarily, include, for example, antenna 1025, transceiver 1015, communications manager 1020, memory 1030 (including code 1035), processor 1040, and/or bus 1045.

Figure 16:
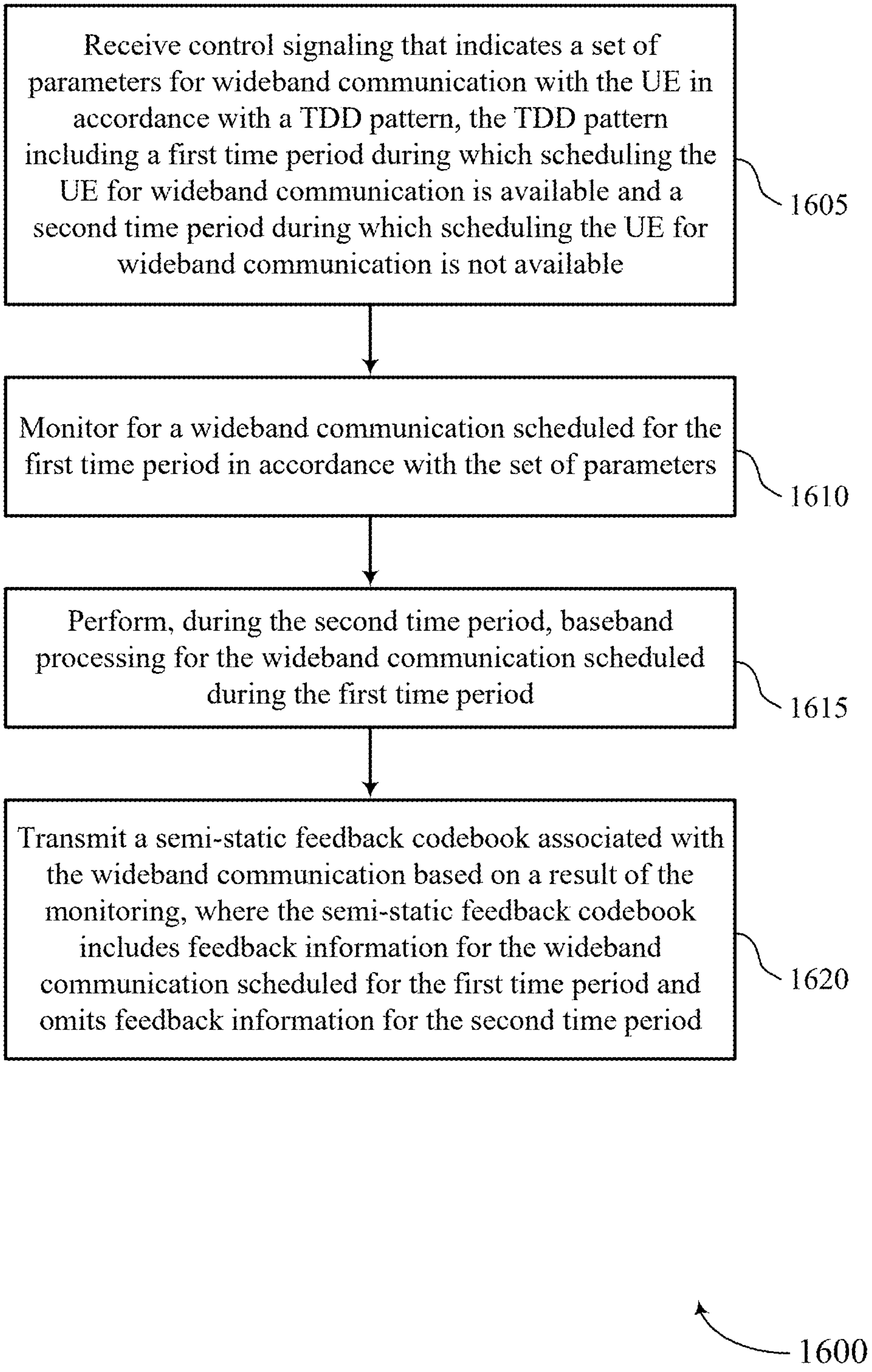

FIG. 16 shows a flowchart illustrating a method 1600 that supports enhancements for semi-static codebook with efficient scheduling in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving control signaling that indicates a set of parameters for wideband communication with the UE in accordance with a TDD pattern, the TDD pattern including a first time period during which scheduling the UE for wideband communication is available and a second time period during which scheduling the UE for wideband communication is not available. The operations of 1605 may be performed in accordance with examples as disclosed herein. In some examples, aspects of the operations of 1605 may be performed by a control manager 925 as described with reference to FIG. 9. Additionally, or alternatively, means for performing 1605 may, but not necessarily, include, for example, antenna 1025, transceiver 1015, communications manager 1020, memory 1030 (including code 1035), processor 1040, and/or bus 1045.

At 1610, the method may include monitoring for a wideband communication scheduled for the first time period in accordance with the set of parameters. The operations of 1610 may be performed in accordance with examples as disclosed herein. In some examples, aspects of the operations of 1610 may be performed by a monitoring manager 930 as described with reference to FIG. 9. Additionally, or alternatively, means for performing 1610 may, but not necessarily, include, for example, antenna 1025, transceiver 1015, communications manager 1020, memory 1030 (including code 1035), processor 1040, and/or bus 1045.

At 1615, the method may include performing, during the second time period, baseband processing for the wideband communication scheduled during the first time period. The operations of 1615 may be performed in accordance with examples as disclosed herein. In some examples, aspects of the operations of 1615 may be performed by a processing manager 940 as described with reference to FIG. 9. Additionally, or alternatively, means for performing 1615 may, but not necessarily, include, for example, antenna 1025, transceiver 1015, communications manager 1020, memory 1030 (including code 1035), processor 1040, and/or bus 1045.

At 1620, the method may include transmitting a semi-static feedback codebook associated with the wideband communication based on a result of the monitoring, where the semi-static feedback codebook includes feedback information for the wideband communication scheduled for the first time period and omits feedback information for the second time period. The operations of 1620 may be performed in accordance with examples as disclosed herein. In some examples, aspects of the operations of 1620 may be performed by a feedback manager 935 as described with reference to FIG. 9. Additionally, or alternatively, means for performing 1620 may, but not necessarily, include, for example, antenna 1025, transceiver 1015, communications manager 1020, memory 1030 (including code 1035), processor 1040, and/or bus 1045.

Figure 17:
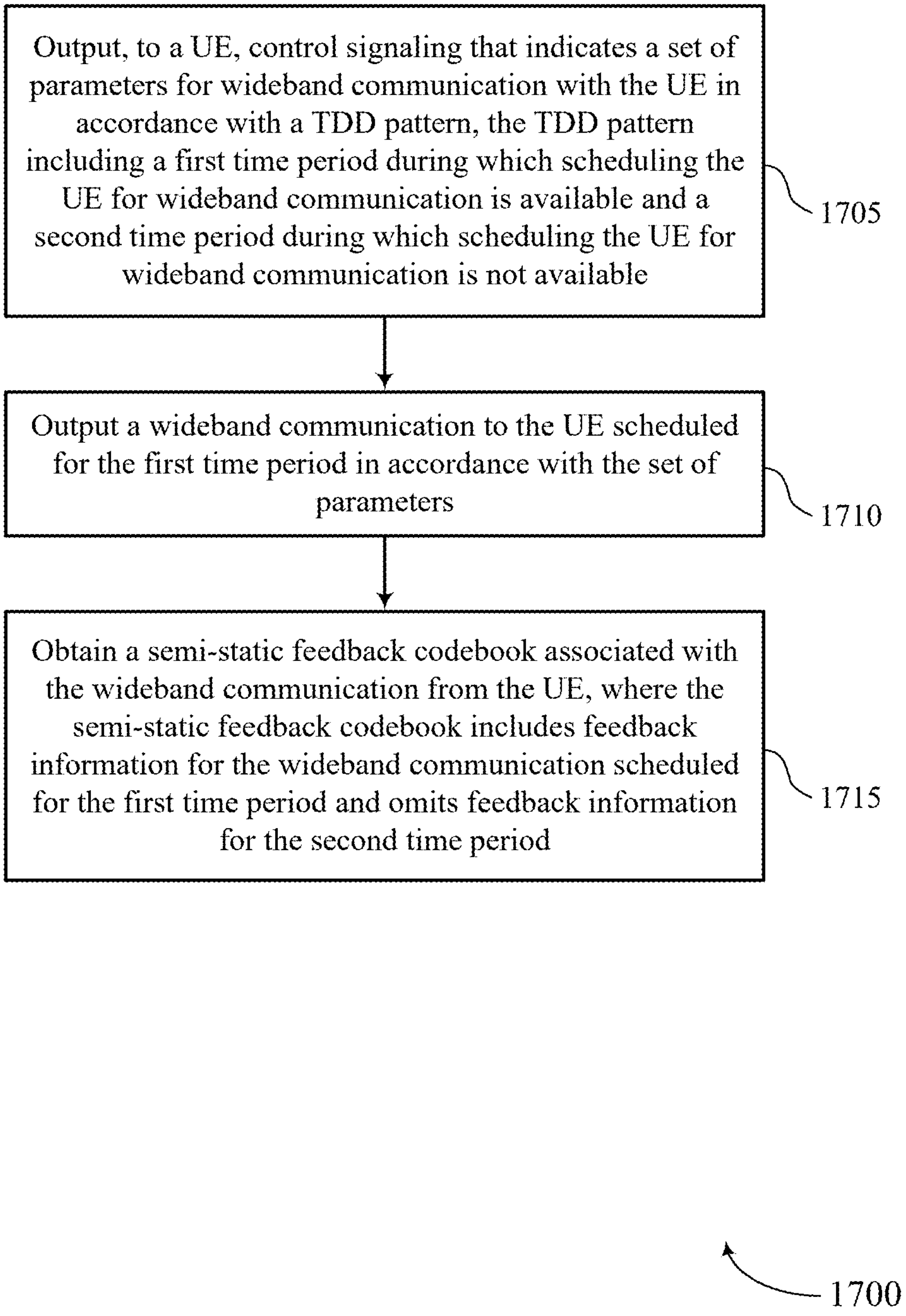

FIG. 17 shows a flowchart illustrating a method 1700 that supports enhancements for semi-static codebook with efficient scheduling in accordance with one or more aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include outputting, to a UE, control signaling that indicates a set of parameters for wideband communication with the UE in accordance with a TDD pattern, the TDD pattern including a first time period during which scheduling the UE for wideband communication is available and a second time period during which scheduling the UE for wideband communication is not available. The operations of 1705 may be performed in accordance with examples as disclosed herein. In some examples, aspects of the operations of 1705 may be performed by a control manager 1325 as described with reference to FIG. 13. Additionally, or alternatively, means for performing 1705 may, but not necessarily, include, for example, antenna 1415, transceiver 1410, communications manager 1420, memory 1425 (including code 1430), processor 1435, and/or bus 1440.

At 1710, the method may include outputting a wideband communication to the UE scheduled for the first time period in accordance with the set of parameters. The operations of 1710 may be performed in accordance with examples as disclosed herein. In some examples, aspects of the operations of 1710 may be performed by an output manager 1330 as described with reference to FIG. 13. Additionally, or alternatively, means for performing 1710 may, but not necessarily, include, for example, antenna 1415, transceiver 1410, communications manager 1420, memory 1425 (including code 1430), processor 1435, and/or bus 1440.

At 1715, the method may include obtaining a semi-static feedback codebook associated with the wideband communication from the UE, where the semi-static feedback codebook includes feedback information for the wideband communication scheduled for the first time period and omits feedback information for the second time period. The operations of 1715 may be performed in accordance with examples as disclosed herein. In some examples, aspects of the operations of 1715 may be performed by a feedback manager 1335 as described with reference to FIG. 13. Additionally, or alternatively, means for performing 1715 may, but not necessarily, include, for example, antenna 1415, transceiver 1410, communications manager 1420, memory 1425 (including code 1430), processor 1435, and/or bus 1440.

The following provides an overview of aspects of the present disclosure:

Aspect 1: A method for wireless communications at a UE, comprising: receiving control signaling that indicates a set of parameters for wideband communication with the UE in accordance with a TDD pattern, the TDD pattern comprising a first time period during which scheduling the UE for wideband communication is available and a second time period during which scheduling the UE for wideband communication is not available; monitoring for a wideband communication scheduled for the first time period in accordance with the set of parameters; and transmitting a semi-static feedback codebook associated with the wideband communication based on a result of the monitoring, wherein the semi-static feedback codebook includes feedback information for the wideband communication scheduled for the first time period and omits feedback information for the second time period.

Aspect 2: The method of aspect 1, wherein the first time period of the TDD pattern comprises a plurality of scheduling opportunities during which scheduling the UE for wideband communications is available and the semi-static feedback codebook includes separate feedback information for each scheduling opportunity included in the plurality of scheduling opportunities.

Aspect 3: The method of any of aspects 1 through 2, wherein the first time period of the TDD pattern comprises a bundled set of scheduling opportunities during which scheduling the UE for wideband communications is available and the semi-static feedback codebook includes a single feedback information for the bundled set of scheduling opportunities.

Aspect 4: The method of any of aspects 1 through 3, further comprising: performing, during the second time period, baseband processing for the wideband communication scheduled during the first time period.

Aspect 5: The method of aspect 4, wherein the baseband processing is performed while the UE is operating at a second power level that is a lower power level than a first power level the UE is operating at during the first time period.

Aspect 6: The method of any of aspects 1 through 5, wherein the set of parameters identifies a set of candidate scheduling offsets between the first time period and a transmission time associated with the semi-static feedback codebook, the second time period is identified based at least in part on the set of candidate scheduling offsets, and the set of candidate scheduling offsets is a smaller set than a set of available scheduling offsets.

Aspect 7: The method of any of aspects 1 through 6, wherein the set of parameters identifies a set of candidate scheduling offsets between the first time period and a transmission time associated with the semi-static feedback codebook, the second time period is identified based at least in part on the set of candidate scheduling offsets, and the set of candidate scheduling offsets includes one or more candidate scheduling offsets that exceed a scheduling offset threshold associated with a set of available scheduling offsets.

Aspect 8: The method of any of aspects 1 through 7, wherein the TDD pattern comprises a set of time segments, each time segment comprising the first time period during which scheduling the UE for wideband communication is available and the second time period during which the UE performs baseband processing of the wideband communication received during the first time period.

Aspect 9: The method of aspect 8, wherein the semi-static feedback codebook comprises feedback information for the first time period in each time segment.

Aspect 10: A method for wireless communications at a network entity, comprising: outputting, to a UE, control signaling that indicates a set of parameters for wideband communication with the UE in accordance with a TDD pattern, the TDD pattern comprising a first time period during which scheduling the UE for wideband communication is available and a second time period during which scheduling the UE for wideband communication is not available; outputting a wideband communication to the UE scheduled for the first time period in accordance with the set of parameters; and obtaining a semi-static feedback codebook associated with the wideband communication from the UE, wherein the semi-static feedback codebook includes feedback information for the wideband communication scheduled for the first time period and omits feedback information for the second time period.

Aspect 11: The method of aspect 10, wherein the first time period of the TDD pattern comprises a plurality of scheduling opportunities during which scheduling the UE for wideband communications is available and the semi-static feedback codebook includes separate feedback information for each scheduling opportunity included in the plurality of scheduling opportunities.

Aspect 12: The method of any of aspects 10 through 11, wherein the first time period of the TDD pattern comprises a bundled set of scheduling opportunities during which scheduling the UE for wideband communications is available and the semi-static feedback codebook includes a single feedback information for the bundled set of scheduling opportunities.

Aspect 13: The method of any of aspects 10 through 12, wherein the set of parameters identifies a set of candidate scheduling offsets between the first time period and a transmission time associated with the semi-static feedback codebook, the second time period is identified based at least in part on the set of candidate scheduling offsets, and the set of candidate scheduling offsets is a smaller set than a set of available scheduling offsets.

Aspect 14: The method of any of aspects 10 through 13, wherein the set of parameters identifies a set of candidate scheduling offsets between the first time period and a transmission time associated with the semi-static feedback codebook, the second time period is identified based at least in part on the set of candidate scheduling offsets, and the set of candidate scheduling offsets includes one or more candidate scheduling offsets that exceed a scheduling offset threshold associated with a set of available scheduling offsets.

Aspect 15: The method of any of aspects 10 through 14, wherein the TDD pattern comprises a set of time segments, each time segment comprising the first time period during which scheduling the UE for wideband communication is available and the second time period during which the UE performs baseband processing of the wideband communication received during the first time period.

Aspect 16: The method of aspect 15, wherein the semi-static feedback codebook comprises feedback information for the first time period in each time segment.

Aspect 17: A UE for wireless communications, comprising one or more memories storing processor-executable code, a transceiver, and one or more processors coupled with the one or more memories and transceiver, the one or more processors individually or collectively operable to execute the code to cause the UE to perform a method of any of aspects 1 through 9.

Aspect 18: A UE for wireless communications, comprising at least one means for performing a method of any of aspects 1 through 9.

Aspect 19: A non-transitory computer-readable medium storing code for wireless communications, the code comprising instructions executable by one or more processors to perform a method of any of aspects 1 through 9.

Aspect 20: A network entity for wireless communications, comprising one or more memories storing processor-executable code and one or more processors coupled with the one or more memories, the one or more processors individually or collectively operable to execute the code to cause the network entity to perform a method of any of aspects 10 through 16.

Aspect 21: A network entity for wireless communications, comprising at least one means for performing a method of any of aspects 10 through 16.

Aspect 22: A non-transitory computer-readable medium storing code for wireless communications, the code comprising instructions executable by one or more processors to perform a method of any of aspects 10 through 16.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code;
a transceiver; and
one or more processors coupled with the one or more memories and the transceiver, the one or more processors individually or collectively operable to execute the code to cause the UE to:
receive control signaling that indicates a set of parameters for wideband communication with the UE in accordance with a time division duplexing (TDD) pattern, the TDD pattern comprising a first time period during which scheduling the UE for wideband communication is available and a second time period during which scheduling the UE for wideband communication is not available;

monitor for a wideband communication scheduled for the first time period in accordance with the set of parameters; and transmit a semi-static feedback codebook associated with the wideband communication based on a result of the monitoring, wherein the semi-static feedback codebook includes feedback information for the wideband communication scheduled for the first time period and omits feedback information for the second time period.

2. The UE of claim 1, wherein the first time period of the TDD pattern comprises a plurality of scheduling opportunities during which scheduling the UE for wideband communications is available and the semi-static feedback codebook includes separate feedback information for each scheduling opportunity included in the plurality of scheduling opportunities.

3. The UE of claim 1, wherein the first time period of the TDD pattern comprises a bundled set of scheduling opportunities during which scheduling the UE for wideband communications is available and the semi-static feedback codebook includes a single feedback information for the bundled set of scheduling opportunities.

4. The UE of claim 1, wherein the one or more processors are individually or collectively further operable to execute the code to cause the UE to:

perform, during the second time period, baseband processing for the wideband communication scheduled during the first time period.

5. The UE of claim 4, wherein the one or more processors are individually or collectively further operable to execute the code to cause the UE to perform the baseband processing while the UE is operating at a second power level that is a lower power level than a first power level the UE is operating at during the first time period.

6. The UE of claim 1, wherein the set of parameters identifies a set of candidate scheduling offsets between the first time period and a transmission time associated with the semi-static feedback codebook, the second time period is identified based at least in part on the set of candidate scheduling offsets, and the set of candidate scheduling offsets is a smaller set than a set of available scheduling offsets.

7. The UE of claim 1, wherein the set of parameters identifies a set of candidate scheduling offsets between the first time period and a transmission time associated with the semi-static feedback codebook, the second time period is identified based at least in part on the set of candidate scheduling offsets, and the set of candidate scheduling offsets includes one or more candidate scheduling offsets that exceed a scheduling offset threshold associated with a set of available scheduling offsets.

8. The UE of claim 1, wherein the TDD pattern comprises a set of time segments, each time segment comprising the first time period during which scheduling the UE for wideband communication is available and the second time period during which the UE performs baseband processing of the wideband communication received during the first time period.

9. The UE of claim 8, wherein the semi-static feedback codebook comprises feedback information for the first time period in each time segment.

10. A network entity, comprising:

one or more memories storing processor-executable code; and one or more processors coupled with the one or more memories and individually or collectively operable to execute the code to cause the network entity to:

output, to a user equipment (UE), control signaling that indicates a set of parameters for wideband communication with the UE in accordance with a time division duplexing (TDD) pattern, the TDD pattern comprising a first time period during which scheduling the UE for wideband communication is available and a second time period during which scheduling the UE for wideband communication is not available;

output a wideband communication to the UE scheduled for the first time period in accordance with the set of parameters; and obtain a semi-static feedback codebook associated with the wideband communication from the UE, wherein the semi-static feedback codebook includes feedback information for the wideband communication scheduled for the first time period and omits feedback information for the second time period.

11. The network entity of claim 10, wherein the first time period of the TDD pattern comprises a plurality of scheduling opportunities during which scheduling the UE for wideband communications is available and the semi-static feedback codebook includes separate feedback information for each scheduling opportunity included in the plurality of scheduling opportunities.

12. The network entity of claim 10, wherein the first time period of the TDD pattern comprises a bundled set of scheduling opportunities during which scheduling the UE for wideband communications is available and the semi-static feedback codebook includes a single feedback information for the bundled set of scheduling opportunities.

13. The network entity of claim 10, wherein the set of parameters identifies a set of candidate scheduling offsets between the first time period and a transmission time associated with the semi-static feedback codebook, the second time period is identified based at least in part on the set of candidate scheduling offsets, and the set of candidate scheduling offsets is a smaller set than a set of available scheduling offsets.

14. The network entity of claim 10, wherein the set of parameters identifies a set of candidate scheduling offsets between the first time period and a transmission time associated with the semi-static feedback codebook, the second time period is identified based at least in part on the set of candidate scheduling offsets, and the set of candidate scheduling offsets includes one or more candidate scheduling offsets that exceed a scheduling offset threshold associated with a set of available scheduling offsets.

15. The network entity of claim 10, wherein the TDD pattern comprises a set of time segments, each time segment comprising the first time period during which scheduling the UE for wideband communication is available and the second time period during which the UE performs baseband processing of the wideband communication received during the first time period.

16. The network entity of claim 15, wherein the semi-static feedback codebook comprises feedback information for the first time period in each time segment.

17. A method for wireless communications at a user equipment (UE), comprising:

receiving control signaling that indicates a set of parameters for wideband communication with the UE in accordance with a time division duplexing (TDD) pattern, the TDD pattern comprising a first time period during which scheduling the UE for wideband communication is available and a second time period during which scheduling the UE for wideband communication is not available;

monitoring for a wideband communication scheduled for the first time period in accordance with the set of parameters; and transmitting a semi-static feedback codebook associated with the wideband communication based on a result of the monitoring, wherein the semi-static feedback codebook includes feedback information for the wideband communication scheduled for the first time period and omits feedback information for the second time period.

18. The method of claim 17, wherein the first time period of the TDD pattern comprises a plurality of scheduling opportunities during which scheduling the UE for wideband communications is available and the semi-static feedback codebook includes separate feedback information for each scheduling opportunity included in the plurality of scheduling opportunities.

19. The method of claim 17, wherein the first time period of the TDD pattern comprises a bundled set of scheduling opportunities during which scheduling the UE for wideband communications is available and the semi-static feedback codebook includes a single feedback information for the bundled set of scheduling opportunities.

20. The method of claim 17, further comprising:

performing, during the second time period, baseband processing for the wideband communication scheduled during the first time period.

21. The method of claim 20, wherein the baseband processing is performed while the UE is operating at a second power level that is a lower power level than a first power level the UE is operating at during the first time period.

22. The method of claim 17, wherein the set of parameters identifies a set of candidate scheduling offsets between the first time period and a transmission time associated with the semi-static feedback codebook, the second time period is identified based at least in part on the set of candidate scheduling offsets, and the set of candidate scheduling offsets is a smaller set than a set of available scheduling offsets.

23. The method of claim 17, wherein the set of parameters identifies a set of candidate scheduling offsets between the first time period and a transmission time associated with the semi-static feedback codebook, the second time period is identified based at least in part on the set of candidate scheduling offsets, and the set of candidate scheduling offsets includes one or more candidate scheduling offsets that exceed a scheduling offset threshold associated with a set of available scheduling offsets.

24. The method of claim 17, wherein the TDD pattern comprises a set of time segments, each time segment comprising the first time period during which scheduling the UE for wideband communication is available and the second time period during which the UE performs baseband processing of the wideband communication received during the first time period.

25. The method of claim 24, wherein the semi-static feedback codebook comprises feedback information for the first time period in each time segment.

26. A method for wireless communications at a network entity, comprising:

outputting, to a user equipment (UE), control signaling that indicates a set of parameters for wideband communication with the UE in accordance with a time division duplexing (TDD) pattern, the TDD pattern comprising a first time period during which scheduling the UE for wideband communication is available and a second time period during which scheduling the UE for wideband communication is not available;

outputting a wideband communication to the UE scheduled for the first time period in accordance with the set of parameters; and obtaining a semi-static feedback codebook associated with the wideband communication from the UE, wherein the semi-static feedback codebook includes feedback information for the wideband communication scheduled for the first time period and omits feedback information for the second time period.

27. The method of claim 26, wherein the first time period of the TDD pattern comprises a plurality of scheduling opportunities during which scheduling the UE for wideband communications is available and the semi-static feedback codebook includes separate feedback information for each scheduling opportunity included in the plurality of scheduling opportunities.

28. The method of claim 26, wherein the first time period of the TDD pattern comprises a bundled set of scheduling opportunities during which scheduling the UE for wideband communications is available and the semi-static feedback codebook includes a single feedback information for the bundled set of scheduling opportunities.

29. The method of claim 26, wherein the set of parameters identifies a set of candidate scheduling offsets between the first time period and a transmission time associated with the semi-static feedback codebook, the second time period is identified based at least in part on the set of candidate scheduling offsets, and the set of candidate scheduling offsets is a smaller set than a set of available scheduling offsets.

30. The method of claim 26, wherein the set of parameters identifies a set of candidate scheduling offsets between the first time period and a transmission time associated with the semi-static feedback codebook, the second time period is identified based at least in part on the set of candidate scheduling offsets, and the set of candidate scheduling offsets includes one or more candidate scheduling offsets that exceed a scheduling offset threshold associated with a set of available scheduling offsets.

* * * * *